United States Patent
Park et al.

(10) Patent No.: US 12,517,602 B2
(45) Date of Patent: Jan. 6, 2026

(54) ELECTRONIC DEVICE

(71) Applicant: Samsung Display Co., Ltd., Yongin-Si (KR)

(72) Inventors: Jungmok Park, Hwaseong-si (KR); Tae Yong Eom, Suwon-si (KR); Hyun-Wook Cho, Yongin-si (KR); Dongjin Moon, Cheonan-si (KR); Yeri Jeong, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/887,116

(22) Filed: Sep. 17, 2024

(65) Prior Publication Data

US 2025/0013325 A1   Jan. 9, 2025

Related U.S. Application Data

(63) Continuation of application No. 18/231,822, filed on Aug. 9, 2023, now Pat. No. 12,118,159, which is a
(Continued)

(30) Foreign Application Priority Data

Oct. 5, 2020   (KR) ........................ 10-2020-0128090

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/0443* (2019.05)

(58) Field of Classification Search
CPC .......... G06F 3/0164; G06F 3/041–046; G06F 2203/041–04114
See application file for complete search history.

(56) References Cited

U.S. PATENT DOCUMENTS 8,440,920 B2   5/2013   Bulea et al.
8,502,949 B2   8/2013   Han et al.
(Continued)

FOREIGN PATENT DOCUMENTS

KR   10-2012-0060310 A   6/2012
KR   10-2016-0006996     1/2016
(Continued)

*Primary Examiner* — Sanjiv D. Patel
(74) *Attorney, Agent, or Firm* — F. CHAU & ASSOCIATES, LLC

(57) ABSTRACT

An electronic device including: a display layer; and a sensor layer that includes: first electrodes in a sensing area and having different lengths; second electrodes in the sensing area; first cross electrodes in the sensing area; second cross electrodes in the sensing area and having different lengths; pads in a peripheral area; first lines extended from the first electrodes at a first side of the sensing area towards the pads; second lines extended from the second electrodes at a second side of the sensing area towards the pads; first cross lines extending from the first cross electrodes towards the pads; and second cross lines extending from the second cross electrodes towards the pads, the first lines being different from the second lines in number, and the first cross lines being different from the second cross lines in number.

20 Claims, 15 Drawing Sheets

Related U.S. Application Data continuation of application No. 17/966,949, filed on Oct. 17, 2022, now Pat. No. 11,762,492, which is a continuation of application No. 17/360,603, filed on Jun. 28, 2021, now Pat. No. 11,474,631.

(56) References Cited

U.S. PATENT DOCUMENTS

| | | | |
|---|---|---|---|
| 9,954,049 | B2 | 4/2018 | Im et al. |
| 10,007,384 | B2 | 6/2018 | Park |
| 10,788,905 | B2 | 9/2020 | Kim et al. |
| 10,824,262 | B2 | 11/2020 | Kwon et al. |
| 11,474,631 | B2 | 10/2022 | Park et al. |
| 11,762,492 | B2 | 9/2023 | Park et al. |
| 2016/0048246 | A1* | 2/2016 | Park .................. G06F 3/04166 345/173 |
| 2016/0239131 | A1 | 8/2016 | Kang |
| 2016/0328036 | A1* | 11/2016 | Lee .................. G06F 3/04186 |
| 2018/0120988 | A1* | 5/2018 | Kim .................. G06F 3/0418 |
| 2020/0142563 | A1* | 5/2020 | Kim .................. G06F 3/0446 |
| 2020/0150796 | A1 | 5/2020 | Kim et al. |
| 2021/0004112 | A1 | 1/2021 | Miyamoto |
| 2022/0107696 | A1 | 4/2022 | Park et al. |
| 2023/0043335 | A1 | 2/2023 | Park et al. |
| 2023/0384877 | A1 | 11/2023 | Park et al. |

FOREIGN PATENT DOCUMENTS

| | | |
|---|---|---|
| KR | 10-2016-0021379 | 2/2016 |
| KR | 10-2016-0101295 A | 8/2016 |
| KR | 10-2017-0093714 | 8/2017 |
| KR | 10-1817527 | 1/2018 |
| KR | 10-2019-0064968 | 6/2019 |

\* cited by examiner

ELECTRONIC DEVICE

CROSS-REFERENCE TO RELATED APPLICATIONS

This U.S. non-provisional patent application is a continuation of U.S. patent application Ser. No. 18/231,822 filed on Aug. 9, 2023, which is a continuation of U.S. patent application Ser. No. 17/966,949 filed on Oct. 17, 2022, now U.S. Pat. No. 11,762,492, which is a continuation of U.S. patent application Ser. No. 17/360,603 filed on Jun. 28, 2021, now U.S. Pat. No. 11,474,631, which claims priority under 35 U.S.C. § 119 to Korean Patent Application No. 10-2020-0128090, filed on Oct. 5, 2020, the disclosures of which are incorporated by reference herein in their entireties.

Technical Field

The present disclosure relates to an electronic device including a sensor layer having increased sensing sensitivity.

Discussion of Related Art

Electronic devices, such as display devices, may include display layers for displaying images and sensor layers for detecting external inputs. In this case, the electronic device may be said to employ a touch screen. The sensor layers may include a plurality of electrodes. Recently, with electronic devices having active areas in various shapes, the plurality of electrodes may have different lengths.

SUMMARY

An embodiment of the inventive concept provides an electronic device including: a display layer configured to display images; and a sensor layer disposed on the display layer, wherein the sensor layer includes: a plurality of first electrodes disposed in a sensing area of the sensor layer, arranged along a first direction, and having different lengths; a plurality of second electrodes disposed in the sensing area and arranged along the first direction; a plurality of first cross electrodes disposed in the sensing area and arranged along a second direction crossing the first direction; a plurality of second cross electrodes disposed in the sensing area, arranged along the second direction, and having different lengths; a plurality of pads disposed in a peripheral area of the sensor layer; a plurality of first lines extended from the plurality of first electrodes at a first side of the sensing area towards the plurality of pads; a plurality of second lines extended from the plurality of second electrodes at a second side of the sensing area, which is different from the first side, towards the plurality of pads; a plurality of first cross lines extending from the plurality of first cross electrodes towards the plurality of pads; and a plurality of second cross lines extending from the plurality of second cross electrodes towards the plurality of pads, the plurality of first lines being different from the plurality of second lines in number, and the plurality of first cross lines being different from the plurality of second cross lines in number.

The plurality of first electrodes may be spaced apart from the plurality of pads with the plurality of second electrodes therebetween, and the plurality of first lines may be fewer in number than the plurality of second lines.

The sensor layer may have a first connection area and a second connection area; the plurality of first cross electrodes and the plurality of first cross lines may be connected to each other in the first connection area; the plurality of second cross electrodes and the plurality of second cross lines may be connected to each other in the second connection area; and the first connection area may be closer to the plurality of pads than the second connection area.

An area of the second connection area may be smaller than an area of the first connection area.

The plurality of first cross lines may be greater in number than the plurality of second cross lines.

A difference in number between the plurality of first lines and the plurality of second lines may be fewer than a difference in number between the plurality of first cross lines and the plurality of second cross lines.

A first boundary between the plurality of first cross electrodes and the plurality of second cross electrodes may be spaced apart from a first reference line that passes through a center of the sensing area and extends in the first direction.

A second boundary between the plurality of first electrodes and the plurality of second electrodes may be spaced apart from a second reference line passing through the center of the sensing area and extending in the second direction.

A distance between the second boundary and the plurality of pads may be greater than a distance between the second reference line and the plurality of pads.

The plurality of pads may be spaced apart from the first reference line in the second direction.

The plurality of pads may include a plurality of first pads and a plurality of second pads which are spaced apart from each other with the first reference line therebetween.

The display layer may include a plurality of display pads configured to transmit electrical signals to the display layer, and the plurality of pads are spaced apart from the plurality of display pads with the sensing area therebetween.

The plurality of pads may be spaced apart from each other along the second direction.

The plurality of pads may be spaced apart from each other along a direction between the first direction and the second direction.

The plurality of first cross electrodes may be at least three times greater in number than the plurality of second cross electrodes.

A boundary between the sensing area and the peripheral area may have a circle or oval shape.

A first electrode having a maximum length among the plurality of first electrodes may have a shorter length than a second electrode having a maximum length among the plurality of second electrodes, and a first cross electrode having a maximum length among the plurality of first cross electrodes may have a longer length than a second cross electrode having a maximum length among the plurality of second cross electrodes.

An embodiment of the inventive concept provides an electronic device including: a base layer in which a sensing area and a peripheral area around the sensing area are provided; a plurality of electrodes disposed in the sensing area of the base layer; a plurality of cross electrodes disposed in the sensing area of the base layer and crossing the plurality of electrodes; a plurality of lines disposed in the peripheral area of the base layer and electrically connected to the plurality of electrodes, respectively; and a plurality of cross lines disposed in the peripheral area of the base layer and electrically connected to the plurality of cross electrodes, respectively, wherein the plurality of lines include a plurality of first lines extending along a first rotation direction and a plurality of second lines extending along a second rotation direction different from the first rotation direction, the plurality of second lines being provided in a greater number than the plurality of first lines, and the plurality of cross lines include a plurality of first cross lines disposed between the sensing area and the plurality of lines, and a plurality of second cross lines spaced apart from the sensing area with the plurality of second lines therebetween, the plurality of second cross lines being provided in a fewer number than the plurality of first cross lines.

The electronic device may further include a plurality of pads disposed in the peripheral area and electrically connected to the plurality of lines and the plurality of cross lines, respectively; the plurality of electrodes may include a plurality of first electrodes electrically connected to the plurality of first lines, respectively, and a plurality of second electrodes electrically connected to the plurality of second lines, respectively; the plurality of cross electrodes may include a plurality of first cross electrodes electrically connected to the plurality of first cross lines, respectively, and a plurality of second cross electrodes electrically connected to the plurality of second cross lines, respectively; the plurality of first electrodes and the plurality of second electrodes may be sequentially arranged along a first direction, and the plurality of first cross electrodes and the plurality of second cross electrodes may be sequentially arranged along a second direction crossing the first direction; and the plurality of pads may be spaced apart from the plurality of first electrodes with the plurality of second electrodes therebetween.

An embodiment of the inventive concept provides an electronic device including: a display layer configured to display images; and a sensor layer disposed on the display layer, wherein the sensor layer includes a plurality of electrodes disposed in a sensing area, a plurality of cross electrodes disposed in the sensing area and crossing the plurality of electrodes, a plurality of lines disposed in a peripheral area and electrically connected to the plurality of electrodes, and a plurality of cross lines disposed in the peripheral area and electrically connected to the plurality of cross electrodes, wherein the plurality of lines include a plurality of first lines and a plurality of second lines spaced apart from each other with the sensing area therebetween and having a difference in number, the plurality of cross lines include a plurality of first cross lines and a plurality of second cross lines spaced apart from each other with the sensing area therebetween and having a difference in number, and the difference in number between the plurality of first cross lines and the plurality of second cross lines is greater than the difference in number between the plurality of first lines and the plurality of second lines.

An embodiment of the inventive concept provides an electronic device including: a sensor layer, the sensor layer including: a plurality of first electrodes disposed in a sensing area of the sensor layer and extending in a first direction; a plurality of second electrodes disposed in the sensing area and extending in the first direction, wherein a first boundary is provided between the plurality of first electrodes and the plurality of second electrodes, the first boundary being separated by a first distance from a first reference line extending across a center of the sensing area in the first direction; a plurality of first cross electrodes disposed in the sensing area and extending in a second direction intersecting the first direction; and a plurality of second cross electrodes disposed in the sensing area and extending in the second direction, wherein a second boundary is provided between the plurality of first cross electrodes and the plurality of second cross electrodes, the second boundary being separated by a second distance from a second reference line extending across the center of the sensing area in the second direction, the second distance being greater than the first distance.

The electronic device may further include: a plurality of pads disposed in a peripheral area of the sensor layer; a plurality of first lines disposed in the peripheral area and connected to the plurality of first electrodes at a first side of the sensing area; and a plurality of second lines disposed in the peripheral area and connected to the plurality of second electrodes at a second side of the sensing area, wherein a number of the plurality of first lines and a number of the plurality of second lines are different from each other.

The electronic device may further include: a plurality of first cross lines disposed in the peripheral area and connected to the plurality of first cross electrodes at the first side of the sensing area; and a plurality of second cross lines disposed in the peripheral area and connected to the plurality of second cross electrodes at the second side of the sensing area, wherein a number of the plurality of first cross lines and a number of the plurality of second cross lines are different from each other.

The plurality of second cross electrodes may occupy a smaller area than the plurality of first cross electrodes.

The plurality of first electrodes may occupy a smaller area than the plurality of second electrodes.

BRIEF DESCRIPTION OF THE FIGURES

The above and other features of the inventive concept will become readily apparent by reference to the following detailed description when considered in conjunction with the accompanying drawings. In the drawings.

DETAILED DESCRIPTION OF THE EMBODIMENTS

Figure 1:
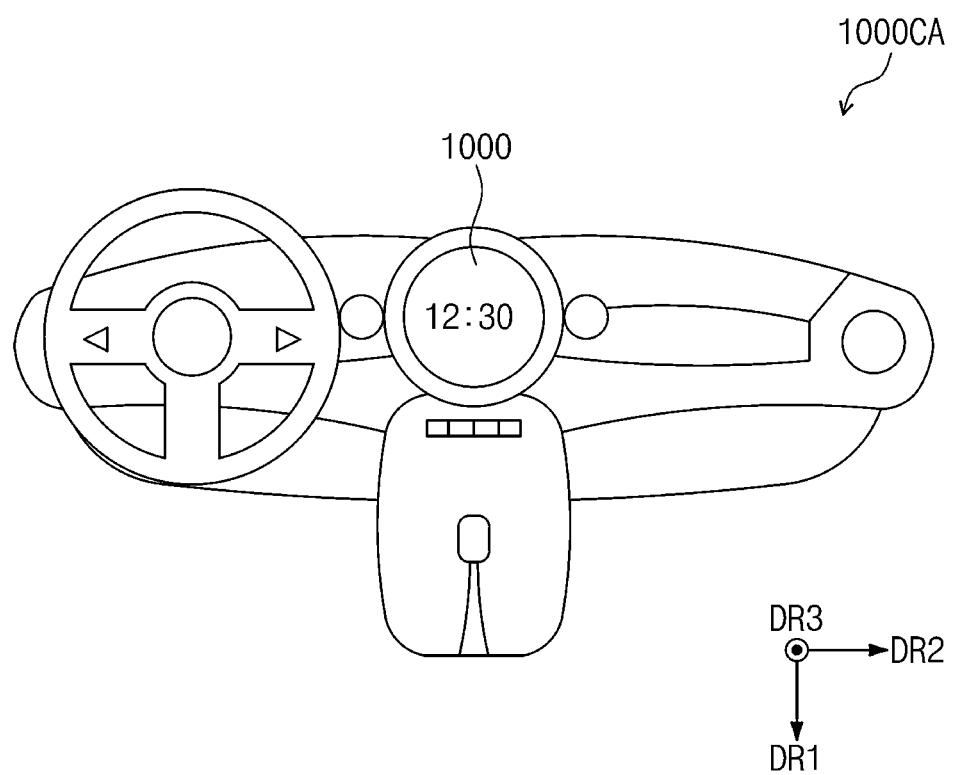
FIG. 1 is an application example of an electronic device according to an embodiment of the inventive concept.

In the present description, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals may refer to like elements. In addition, in the drawings, the thickness, the ratio, and the dimensions of elements may be exaggerated.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

Hereinafter, embodiments of the inventive concept will be described with reference to the accompanying drawings.

FIG. 1 is an application example of an electronic device according to an embodiment of the inventive concept.

Referring to FIG. 1, an electronic device 1000 may be applied to a vehicle 1000CA.

The electronic device 1000 may display images and detect external inputs applied from the outside. For example, the electronic device 1000 may display various types of information required for driving vehicles, for example, navigation information, or icons for operating various systems such as an air conditioner, a heater, a stereo system, and an air circulator, or rear views of the vehicle 1000CA. Users may operate the electronic device 1000 through touch actions.

The electronic device 1000 may have a circular shape and have a size of 10 inches or greater. For example, the electronic device 1000 may have a size of 13.5 inches, but is not limited thereto.

Figure 2:
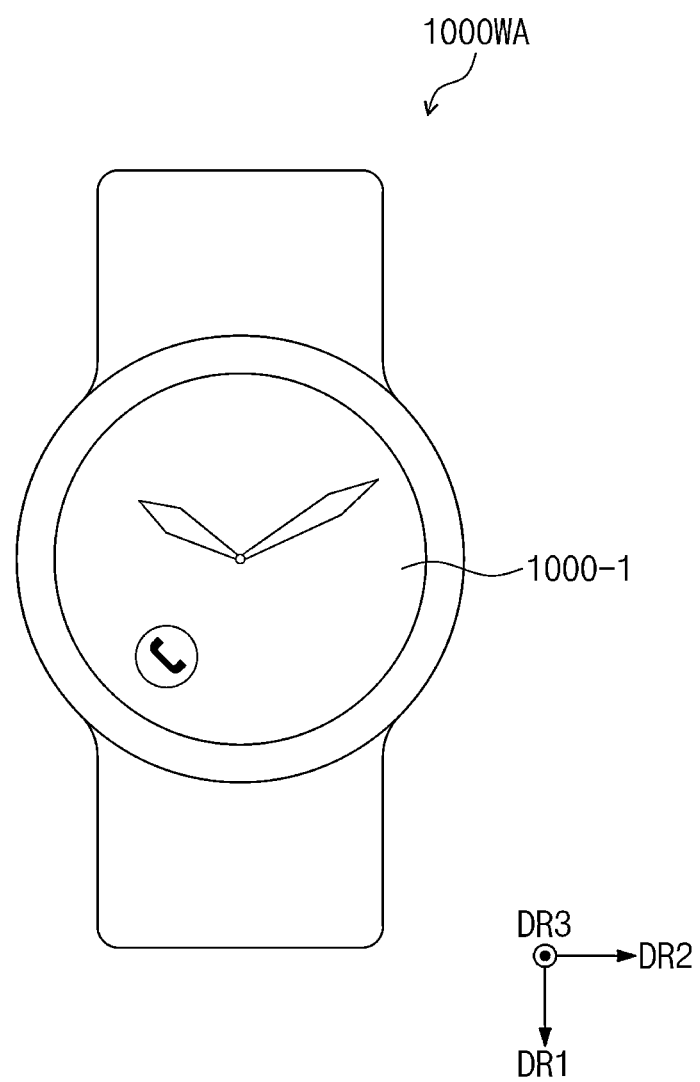
FIG. 2 is an application example of an electronic device according to an embodiment of the inventive concept.

FIG. 2 is an application example of an electronic device according to an embodiment of the inventive concept.

Referring to FIG. 2, an electronic device 1000-1 may be applied to a wearable device 1000WA.

The electronic device 1000-1 may display information on time and weather, or icons for operating various applications or actions. Users may operate the electronic device 1000-1 through touch actions.

FIGS. 1 and 2 illustrate two examples of application to which the electronic device 1000 or 1000-1 is applied, but they are not limited thereto.

Figure 3A:
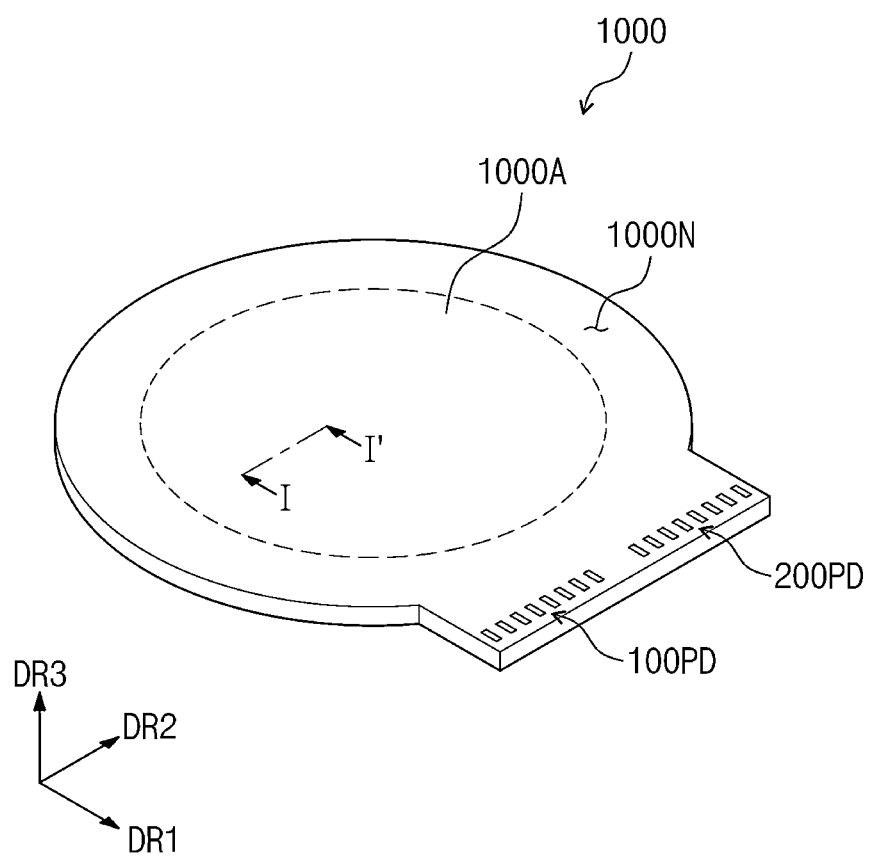
FIG. 3A is a perspective view of an electronic device according to an embodiment of the inventive concept.
Figure 3B:
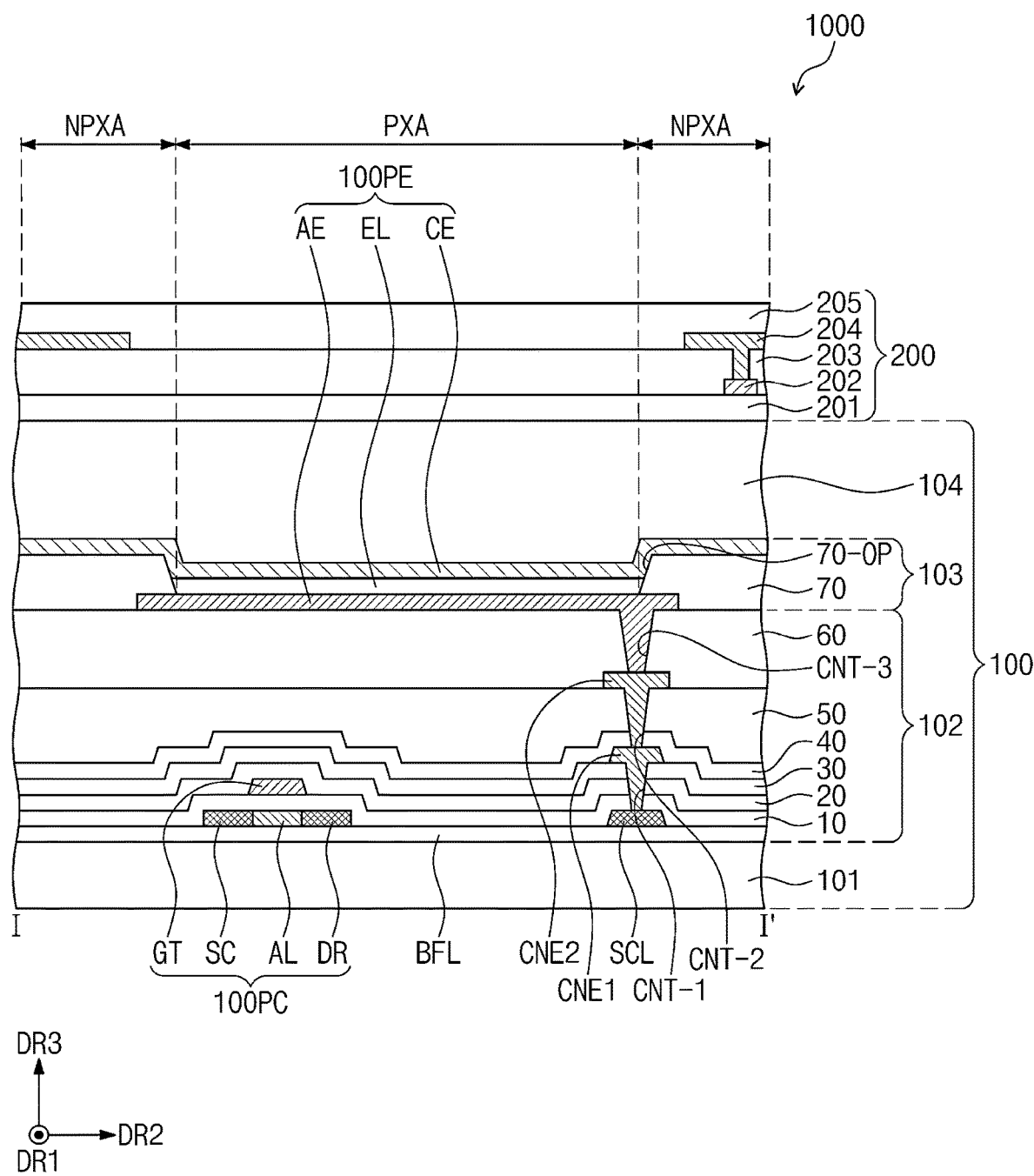
FIG. 3B is a cross-sectional view taken along line I-I' shown in FIG. 3A.

FIG. 3A is a perspective view of an electronic device according to an embodiment of the inventive concept. FIG. 3B is a cross-sectional view taken along line I-I' shown in FIG. 3A.

Referring to FIGS. 3A and 3B, an active area 1000A and a peripheral area 1000N may be provided in the electronic device 1000. The peripheral area 1000N may be adjacent to the active area 1000A and surround the active area 1000A. However, the peripheral area 1000N may be disposed on fewer than all sides of the active area 1000A.

The electronic device 1000 may display images through the active area 1000A and detect inputs applied from the outside. The inputs may be a user's inputs. The user's inputs may include various types of external inputs such as a part of a user's body, light, heat, pen, or pressure.

The active area 1000A may include a plane formed by a first direction DR1 and a second direction DR2, but is not limited thereto. For example, the active area 1000A may include a curved surface or may include both a curved surface and a plane surface. In the present description, a third direction DR3 crossing both the first direction DR1 and the second direction DR2 may be referred to as a thickness direction of the electronic device 1000.

The electronic device 1000 may include a display layer 100 and a sensor layer 200.

The display layer 100 may be configured to generate images. The display layer 100 may be a light emitting display layer, and for example, the display layer 100 may be an organic light emitting display layer, a quantum dot display layer, or a micro light emitting diode (LED) display layer. Hereinafter, as an example, the display layer 100 is described as an organic light emitting display layer, but is not limited thereto.

The sensor layer 200 may be disposed on the display layer 100. The sensor layer 200 may detect external inputs applied from the outside. The external inputs may be a user's inputs. The user's inputs may include various types of external inputs such as a part of a user's body, light, heat, pen, or pressure.

The sensor layer 200 may be formed on the display layer 100 through a continuous process. In this case, the sensor layer 200 may be indicated as being directly disposed on the display layer 100. Being directly disposed may indicate that a third component is not disposed between the sensor layer 200 and the display layer 100. In other words, a separate adhesive member may not be disposed between the sensor layer 200 and the display layer 100.

The electronic device 1000 may include display pads 100PD electrically connected to the display layer 100 and sensor pads 200PD (hereinafter referred to as pads) electrically connected to the sensor layer 200. The display pads 100PD and pads 200PD may be arranged in separate groups. One printed circuit film may be attached to the display pads 100PD and the pads 200PD, but the inventive concept is not limited thereto. For example, a first printed circuit film may be attached to the display pads 100PD, and a second printed circuit film may be attached to the pads 200PD.

Referring to FIG. 3B, the display layer 100 may include a base layer 101, a circuit layer 102, a light emitting element layer 103, and an encapsulation layer 104.

The base layer 101 may be a member providing a base surface on which the circuit layer 102 is disposed. The base layer 101 may be a glass substrate, a metal substrate, or a polymer substrate. However, the embodiment of the inventive concept is not limited thereto, and the base layer 101 may be an inorganic layer, an organic layer, or a composite material layer.

The base layer 101 may have a multilayer structure. For example, the base layer 101 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer. Alternatively, the base layer 101 may include a first synthetic resin layer, an adhesive layer, and a second synthetic resin layer.

The first and second synthetic resin layers each may include a polyimide-based resin. In addition, the first and second synthetic resin layers each may include at least one among an acrylic-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. In addition, in the present description, a "~~"-based resin indicates that a functional group of "~~" is included.

The circuit layer 102 may be disposed on the base layer 101. The circuit layer 102 may include an insulating layer, a semiconductor pattern, a conductive pattern, and a signal line. The insulating layer, the semiconductor layer, and the conductive layer are formed on the base layer 101 through methods such as coating or vapor deposition, and then the insulating layer, the semiconductor layer, and the conductive layer may be selectively patterned a plurality of times in a photolithography process. Thereafter, a semiconductor pattern, a conductive pattern, and a signal line included in the circuit layer 102 may be formed.

At least one inorganic layer is formed on an upper surface of the base layer 101. The inorganic layer may include at least one among aluminum oxide, titanium oxide, silicon oxide, silicon nitride, silicon oxynitride, zirconium oxide, and hafnium oxide. The inorganic layer may be formed as multiple layers. The multi-layered inorganic layers may form a barrier layer and/or a buffer layer. In the present embodiment, the display layer 100 is illustrated to include a buffer layer BFL.

The buffer layer BFL may increase the bonding force between the base layer 101 and the semiconductor pattern. The buffer layer BFL may include a silicon oxide layer and a silicon nitride layer, which may be alternately stacked.

The semiconductor pattern may be disposed on the buffer layer BFL. The semiconductor pattern may include polysilicon. However, the embodiment of the inventive concept is not limited thereto, and the semiconductor pattern may include amorphous silicon or metal oxide.

FIG. 3B shows only some semiconductor patterns. For example, semiconductor patterns may be further disposed in other areas. The semiconductor pattern may be arranged by specific rules over pixels. The semiconductor pattern may have different electrical properties depending on whether or not it is doped. The semiconductor pattern may include a first region having a relatively high conductivity and a second region having a relatively low conductivity. The first region may be doped with the N-type dopant or the P-type dopant. A P-type transistor may include a doped region doped with the P-type dopant, and an N-type transistor may include a doped region doped with the N-type dopant. The second region may be a non-doped region or a region doped at a concentration lower than that of the first region.

The first region may have a conductivity greater than that of the second region and the first region may serve as an electrode or signal line. The second region may correspond to an active (or a channel) of the transistor. In other words, a portion of the semiconductor pattern may be the active of the transistor, another portion of the semiconductor pattern may be a source or a drain of the transistor, and the other portion of the semiconductor pattern may be a connection electrode or a connection signal line.

The pixels each may have an equivalent circuit including seven transistors, one capacitor, and a light emitting element, and the equivalent circuit diagram of the pixels may be modified in various forms. In FIG. 3B, one transistor 100PC and a light emitting element 100PE included in the pixels are illustrated as an example.

A source SC, an active AL, and a drain DR of the transistor 100PC may be formed from the semiconductor pattern. The source SC and the drain DR may extend in opposite directions from the active AL on a cross section. FIG. 3B illustrates a portion of a connection signal line SCL formed from the semiconductor pattern. The connection signal line SCL may be connected to the drain DR of the transistor 100PC on a plane.

A first insulating layer 10 may be disposed on the buffer layer BFL. The first insulating layer 10 may commonly overlap a plurality of pixels and cover the semiconductor pattern. The first insulating layer 10 may be an inorganic layer and/or an organic layer, and have a single-layer or multi-layer structure. The first insulating layer 10 may include at least one among aluminum oxide, titanium oxide, silicon oxide, silicon nitride, silicon oxynitride, zirconium oxide, and hafnium oxide. In the present embodiment, the first insulating layer 10 may be a single-layered silicon oxide layer. Insulating layers of the circuit layer 102 which will be described later in addition to the first insulating layer 10 may be inorganic layers and/or organic layers, and have single-layer or multi-layer structures. The inorganic layer may include at least one of the materials described above, but is not limited thereto.

A gate GT of the transistor 100PC is disposed on the first insulating layer 10. The gate GT may be a portion of a metal pattern. The gate GT overlaps the active AL. In the process of doping the semiconductor pattern, the gate GT may function as a mask.

A second insulating layer 20 may be disposed on the first insulating layer 10 and may cover the gate GT. The second insulating layer 20 may commonly overlap pixels. The second insulating layer 20 may be an inorganic layer and/or an organic layer, and may have a single-layer or multi-layer structure. In the present embodiment, the second insulating layer 20 may be a single-layered silicon oxide layer or silicon nitride layer.

A third insulating layer 30 may be disposed on the second insulating layer 20, and in the present embodiment, the third insulating layer 30 may be a single-layered silicon oxide or silicon nitride.

A first connection electrode CNE1 may be disposed on the third insulating layer 30. The first connection electrode CNE1 may be connected to the connection signal line SCL through a contact hole CNT-1 passing through the first, second, and third insulating layers 10, 20, and 30.

A fourth insulating layer 40 may be disposed on the third insulating layer 30. The fourth insulating layer 40 may be a single-layered silicon oxide. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 103 may be disposed on the circuit layer 102. The light emitting element layer 103 may include the light emitting element 100PE. For example, the light emitting element layer 103 may include organic light emitting materials, quantum dots, quantum rods, or micro LEDs. Hereinafter, the light emitting element 100PE is described as an organic light emitting element as an example, but is not limited thereto.

The light emitting element 100PE may include a first electrode AE, an emission layer EL, and a second electrode CE.

The first electrode AE may be disposed on the sixth insulating layer 60. The first electrode AE may be connected to the second connection electrode CNE2 through a contact hole CNT-3 passing through the sixth insulating layer 60. The first, second and third contact holes CNT-1, CNT-2 and CNT-3 may overlap each other.

A pixel defining film 70 may be disposed on the sixth insulating layer 60 and may cover a portion of the first electrode AE. An opening 70-OP is provided in the pixel defining film 70. The opening 70-OP of the pixel defining film 70 exposes at least a portion of the first electrode AE.

As shown in FIG. 3B, the active area 1000A (see FIG. 3A) may include a light-emitting area PXA and a non-light emitting area NPXA adjacent to the light-emitting area PXA. The non-light-emitting area NPXA may surround the light-emitting area PXA. In the present embodiment, the light-emitting area PXA corresponds to a portion of the first electrode AE exposed through the opening 70-OP. In other words, the portion of the first electrode AE exposed through the opening 70-OP is provided in the light-emitting area PXA.

The emission layer EL may be disposed on the first electrode AE. The emission layer EL may be disposed in an area corresponding to the opening 70-OP. In other words, the emission layer EL may be separately formed on each of the pixels. When the emission layer EL is separately formed on each of the pixels, the emission layers EL each may emit light of at least one color among blue, red, and green. However, the embodiment of the inventive concept is not limited thereto, and the emission layer EL may be connected to the pixels to be commonly provided. In this case, the emission layer EL may provide blue light or white light.

The second electrode CE may be disposed on the emission layer EL. The second electrode CE may have a single-body shape and may be commonly disposed in a plurality of pixels.

A hole control layer may be disposed between the first electrode AE and the emission layer EL. The hole control layer may be commonly disposed in the light-emitting area PXA and the non-light-emitting area NPXA. The hole control layer may include a hole transport layer, and may further include a hole injection layer. An electron control layer may be disposed between the emission layer EL and the second electrode CE. The electron control layer may include an electron transport layer, and may further include an electron injection layer. The hole control layer and the electron control layer may be commonly formed in a plurality of pixels using an open mask.

The encapsulation layer 104 may be disposed on the light emitting element layer 103. The encapsulation layer 104 may include an inorganic layer, an organic layer, and an inorganic layer which are sequentially stacked, but the layers forming the encapsulation layer 104 are not limited thereto.

The inorganic layers of the encapsulation layer 104 may protect the light emitting element layer 103 from moisture and oxygen, and the organic layer may protect the light emitting element layer 103 from foreign substances such as dust particles. The inorganic layers may include a silicon nitride layer, a silicon oxy nitride layer, a silicon oxide layer, a titanium oxide layer, or an aluminum oxide layer. The organic layer of the encapsulation layer 104 may include an acrylic-based organic layer, but is not limited thereto.

The sensor layer 200 may include a base layer 201, a first conductive layer 202, a sensing insulating layer 203, a second conductive layer 204, and a cover insulating layer 205.

The base layer 201 may be an inorganic layer including at least any one among silicon nitride, silicon oxynitride, and silicon oxide. Alternatively, the base layer 201 may be an organic layer including an epoxy resin, an acrylic resin, or an imide-based resin. The base layer 201 may have a single layer structure or may have a multilayer structure stacked along the third direction DR3.

The first conductive layer 202 and the second conductive layer 204 each may have a single layer structure or may have a multilayer structure stacked along the third direction DR3. A conductive pattern included in the first conductive layer 202 and a conductive pattern included in the second conductive layer 204 may be connected to each other through an opening in the sensing insulating layer 203.

The single-layered conductive layer of the first conductive layer 202 and the second conductive layer 204 may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), or indium tin zinc oxide (ITZO). In addition, the transparent conductive layer may include a conductive polymer such as PEDOT, a metal nanowire, graphene, etc.

The conductive layer of the first conductive layer 202 and the second conductive layer 204 having a multi-layered structure may include metal layers. The metal layers may have a three-layer structure of, for example, titanium/aluminum/titanium. The multi-layered conductive layer may include at least one metal layer and at least one transparent conductive layer.

When the first conductive layer 202 and the second conductive layer 204 include a metal layer, the first conductive layer 202 and the second conductive layer 204 may be opaque. Accordingly, the first conductive layer 202 and the second conductive layer 204 may be patterned to non-overlap the light emitting area PXA.

At least any one of the sensing insulating layer 203 or the cover insulating layer 205 may include an inorganic layer. The inorganic layer may include at least one among aluminum oxide, titanium oxide, silicon oxide, silicon nitride, silicon oxynitride, zirconium oxide, and hafnium oxide.

At least any one of the sensing insulating layer 203 or the cover insulating layer 205 may include an organic layer. The organic layer may include at least any one among an acrylic-based resin, a methacrylate-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

Figure 4A:
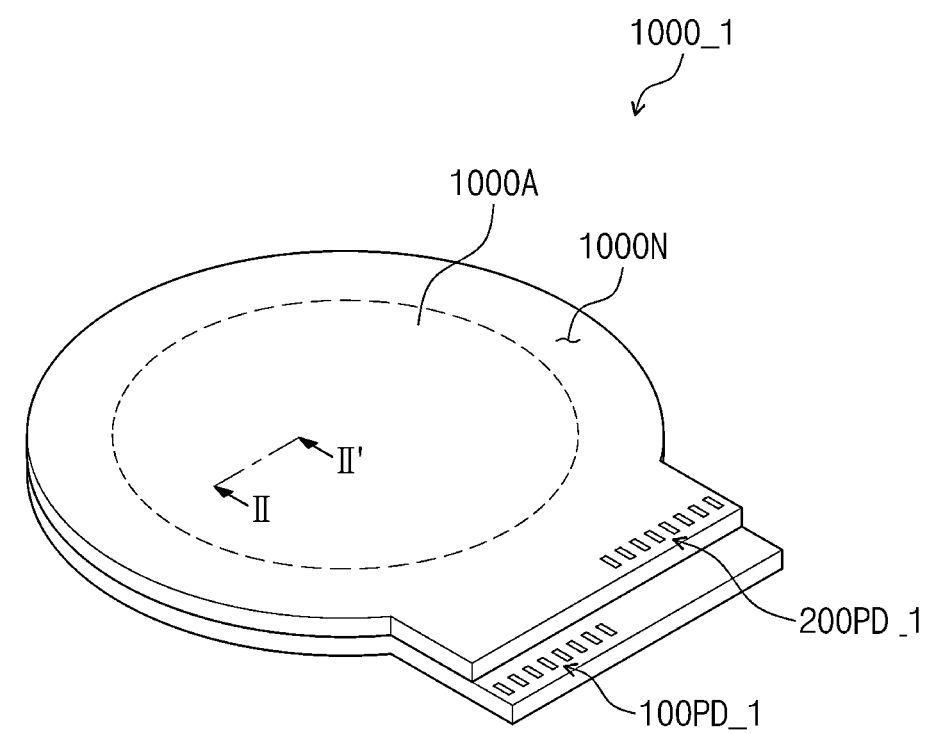
FIG. 4A is a perspective view of an electronic device according to an embodiment of the inventive concept.
Figure 4B:
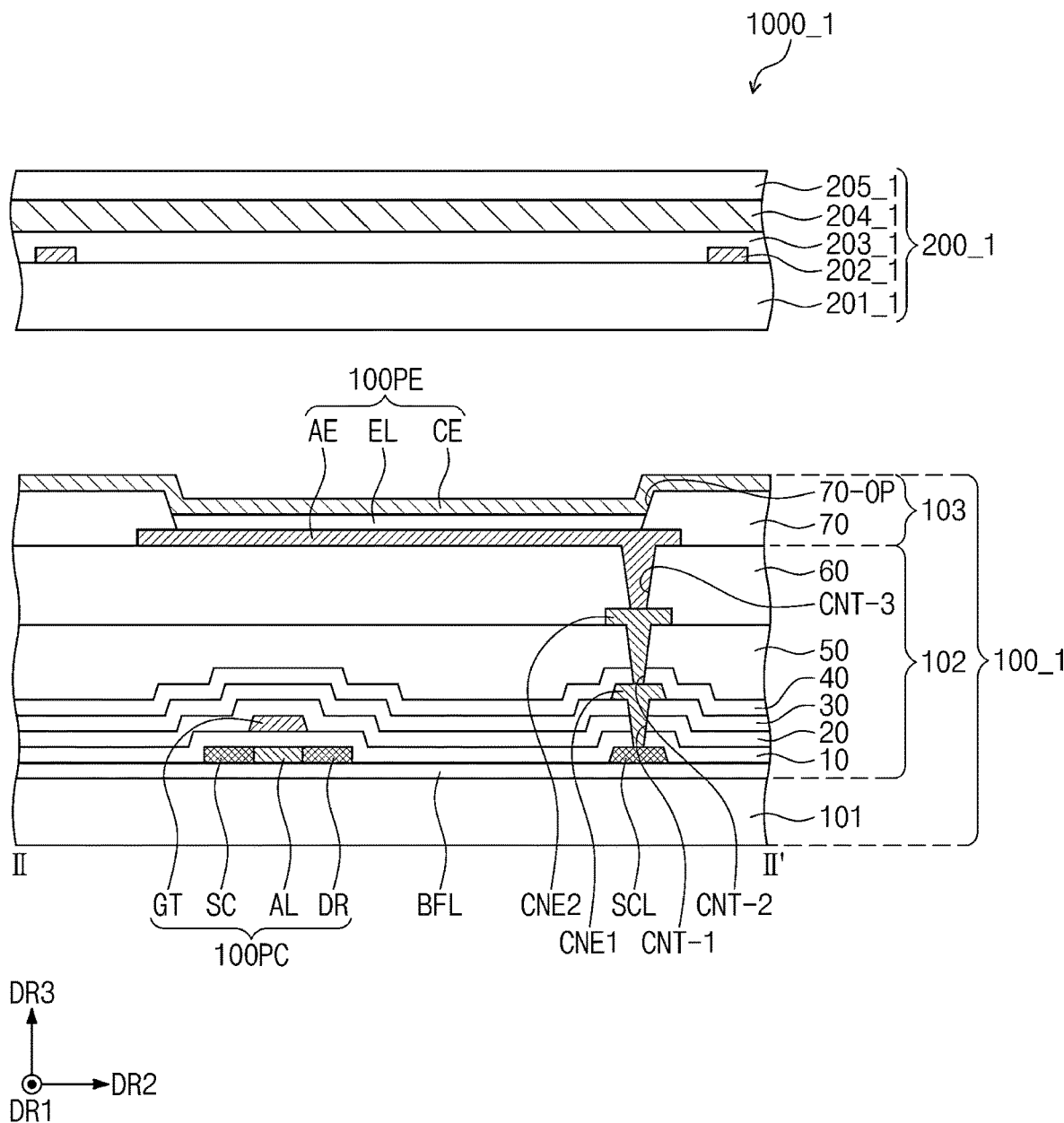
FIG. 4B is a cross-sectional view taken along line II-II' shown in FIG. 4A.

FIG. 4A is a perspective view of an electronic device according to an embodiment of the inventive concept. FIG. 4B is a cross-sectional view taken along line II-II' shown in FIG. 4A.

Referring to FIGS. 4A and 4B, an electronic device 1000_1 may include a first substrate 100_1 and a second substrate 200_1. The first substrate 100_1 may be referred to as a display layer, and the second substrate 200_1 may be referred to as a sensor layer.

The first substrate 100_1 and the second substrate 200_1 may be bonded to each other through a bonding member. For example, the bonding member may be disposed between the first substrate 100_1 and the second substrate 200_1 and may be disposed in the peripheral area 1000N. The bonding member may include an inorganic material or an organic material. For example, the inorganic material may include a frit seal, and the organic material may include a photocurable resin or a photoplastic resin. However, the material forming the bonding member is not limited to the examples described above.

The first substrate 100_1 may include a base layer 101, a circuit layer 102, and a light emitting element layer 103. The descriptions of the base layer 101, the circuit layer 102, and the light emitting element layer 103 are previously provided with reference to FIGS. 3A and 3B, and thus will be omitted.

The second substrate 200_1 may include a base substrate 201_1, a first conductive layer 202_1, a sensing insulating layer 203_1, a second conductive layer 204_1, and a cover insulating layer 205_1.

The base substrate 201_1 may be a glass substrate, a metal substrate, or a polymer substrate. However, the embodiment of the inventive concept is not limited thereto, and the base substrate 200_1 may be an inorganic layer, an organic layer, or a composite material layer.

The first conductive layer 202_1 and the second conductive layer 204_1 each may have a single layer structure or may have a multilayer structure stacked along the third direction DR3. The first conductive layer 202_1 and the second conductive layer 204_1 each may include a metal layer or a transparent conductive layer. For example, the second conductive layer 204_1 may include a transparent conductive layer. In this case, the second conductive layer 204_1 may overlap the light emitting area PXA.

In an embodiment of the inventive concept, at least one insulating layer may be further disposed between the base substrate 201_1 and the first conductive layer 202_1. The at least one insulating layer may be directly formed on the base substrate 201_1 or may be bonded to the base substrate 201_1 through an adhesive layer. The adhesive layer may include an adhesive or a gluing agent.

The first substrate 100_1 may include display pads 100PD_1, and the second substrate 200_1 may include sensor pads 200PD_1 (hereinafter, referred to as pads). The first printed circuit film may be attached to display pads 100PD_1, and the second printed circuit film may be attached to pads 200PD_1. The display pads 100PD_1 may protrude beyond the pads 200PD_1 in the first direction DR1.

The display pads 100PD_1 may be electrically connected to the circuit layer 102 to provide signals to the circuit layer 102. The sensor pads 200PD_1 may be electrically connected to the first conductive layer 202_1 and the second conductive layer 204_1 to provide signals to the first conductive layer 202_1 and the second conductive layer 204_1, or may receive signals from the first conductive layer 202_1 and the second conductive layer 204_1.

Figure 5:
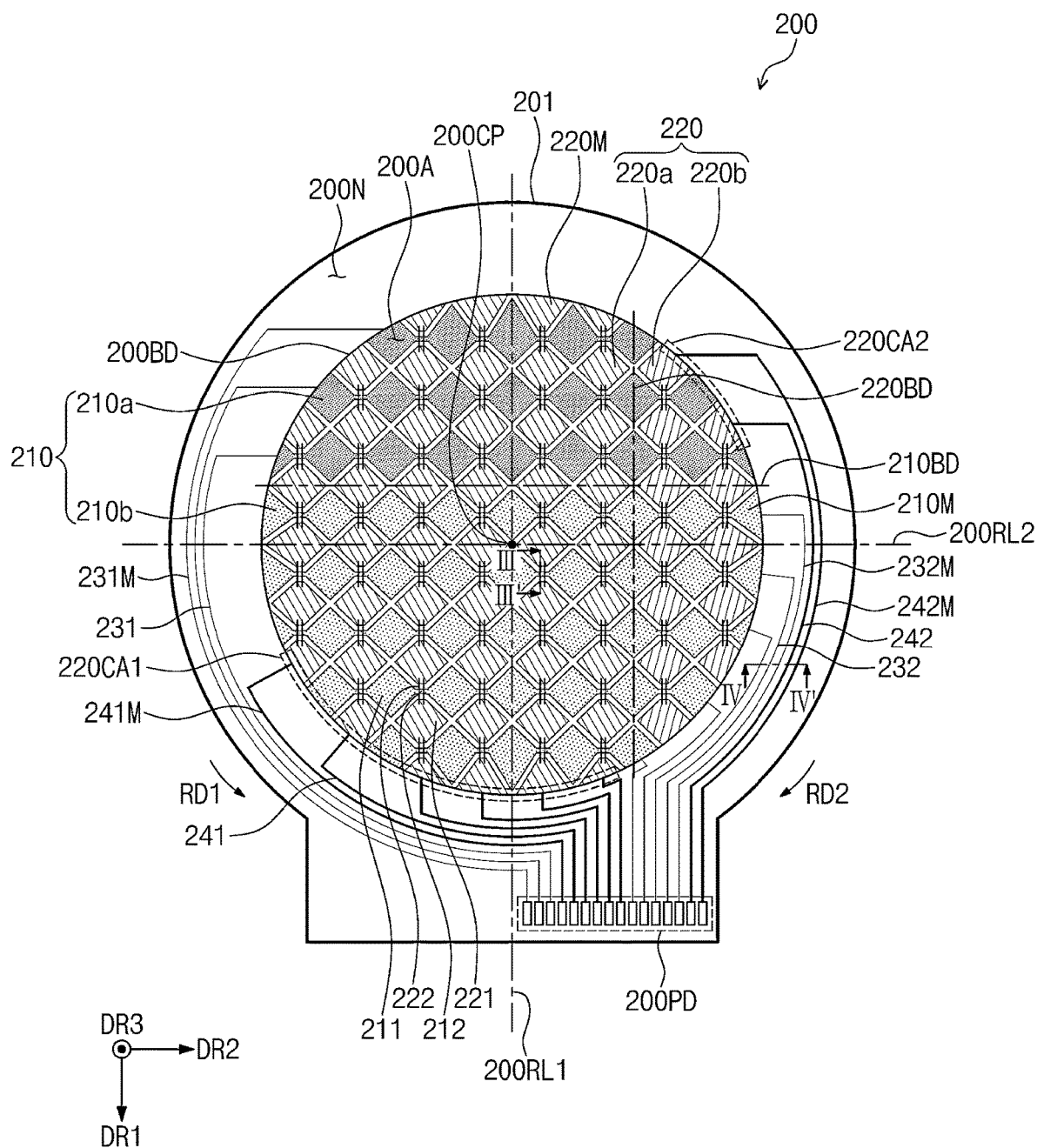
FIG. 5 is a plan view of a sensor layer according to an embodiment of the inventive concept.

FIG. 5 is a plan view of a sensor layer according to an embodiment of the inventive concept.

Referring to FIG. 5, a sensing area 200A and a peripheral area 200N may be provided in the sensor layer 200. The sensing area 200A is an area for detecting external inputs and may correspond to the active area 1000A of FIG. 3A. The peripheral area 200N is disposed around the sensing area 200A, and may correspond to the peripheral area 1000N of FIG. 3A.

A boundary 200BD between the sensing area 200A and the peripheral area 200N may be a circle. However, the boundary 200BD may have a different shape depending on a shape of the sensing area 200A, for example. A center 200CP of the sensing area 200A may correspond to the center of the boundary 200BD. A first reference line 200RL1 may extend along the first direction DR1 and pass through the center 200CP. A second reference line 200RL2 may extend along the second direction DR2 and pass through the center 200CP.

The sensor layer 200 may include a plurality of electrodes 210 (hereinafter referred to as electrodes), a plurality of cross electrodes 220 (hereinafter referred to as cross electrodes), a plurality of lines 231 and 232 (hereinafter referred to as lines), a plurality of cross lines 241 and 242 (hereinafter referred to as cross lines), and a plurality of pads 200PD (hereinafter referred to as pads).

The electrodes 210 and the cross electrodes 220 may be disposed in the sensing area 200A, and the lines 231 and 232, the cross lines 241 and 242, and the pads 200PD may be disposed in the peripheral area 200N. However, connection points between, for example, the cross electrodes 220 and the cross lines 241 and 242 may be in the sensing area 200A. The electronic device 1000 (see FIG. 3A) may obtain information of coordinates on external inputs through changes in mutual capacitance between the electrodes 210 and the cross electrodes 220.

The electrodes 210 may be spaced apart in the first direction DR1. The cross electrodes 220 may be spaced apart in the second direction DR2 crossing the first direction DR1. The electrodes 210 each may extend along the second direction DR2, and the cross electrodes 220 each may extend along the first direction DR1. The electrodes 210 and the cross electrodes 220 may cross each other. In the descriptions below, the length of each of the electrodes 210 may refer to a length in the second direction DR2, and the length of each of the cross electrodes 220 may refer to a length in the first direction DR1.

The boundary 200BD between the sensing area 200A and the peripheral area 200N is a circle, and the electrodes 210 each may thus have various lengths, and the cross electrodes 220 each may thus have various lengths. The length varies, and resistances of the electrodes 210 and the cross electrodes 220 may thus be different from each other, and that may cause a difference in sensing sensitivity. For example, the electrodes 210 located at an upper portion of the sensor layer 200 far from the pads 200PD may have a lower sensing sensitivity than the electrodes 210 located at a lower portion of the sensor layer 200 close to the pads 200PD. According to an embodiment of the inventive concept, the positions of the lines 231 and 232 connected to the electrodes 210 and the cross lines 241 and 242 connected to the cross electrodes 220 may be controlled to reduce a difference in sensitivity. This will be described in detail below.

The electrodes 210 may include first electrodes 210a and second electrodes 210b. The first electrodes 210a and the second electrodes 210b may be arranged along the first direction DR1. The cross electrodes 220 may include first cross electrodes 220a and second cross electrodes 220b. The first cross electrodes 220a and the second cross electrodes 220b may be arranged along the second direction DR2.

In FIG. 5, the first electrodes 210a and the second electrodes 210b are illustrated in different shades to clarify the distinction, and the first cross electrodes 220a and the second cross electrodes 220b are illustrated using different hatchings to clarify the distinction.

FIG. 5 illustrates as an example that the number of first electrodes 210a is three, the number of second electrodes 210b is five, the number of first cross electrodes 220a is six, and the number of second electrodes 220b is two, but the embodiment of the inventive concept is not limited thereto. With an increase in an area of the sensing area 200A, the number of each of the first electrodes 210a, the second electrodes 210b, the first cross electrodes 220a, and the second cross electrodes 220b may increase or decrease.

In FIG. 5, the six first cross electrodes 220a are sequentially arranged along the second direction DR2 from the left to the right, and the two second cross electrodes 220b are arranged at the right side of the six first cross electrodes 220a.

The lines 231 and 232 may be electrically connected to the electrodes 210, respectively. The cross lines 241 and 242 may be electrically connected to the cross electrodes 220, respectively. The lines 231 and 232 may include first lines 231 and second lines 232. The cross lines 241 and 242 may include first cross lines 241 and second cross lines 242. The first lines 231 may be electrically connected to the first electrodes 210a, respectively, and the second lines 232 may be electrically connected to the second electrodes 210b, respectively. The first cross lines 241 may be electrically connected to the first cross electrodes 220a, respectively, and the second cross lines 242 may be electrically connected to the second cross electrodes 220b, respectively.

The first lines 231 and the second lines 232 may be spaced apart from each other with the sensing area 200A therebetween, and the first cross lines 241 and the second cross lines 242 may be spaced apart from each other with the sensing area 200A therebetween. For example, the first lines 231 and the second lines 232 may be disposed at different sides of the sensing area 200A and the first cross lines 241 and the second cross lines 242 may be disposed at different sides of the sensing area 200A.

The electrodes 210 each may include a first end and a second end spaced apart from the first end in the second direction DR2. Electrodes respectively connected to the first lines 231 at the first end among the electrodes 210 may be the first electrodes 210a, and electrodes respectively connected to the second lines 232 at the second end among the electrodes 210 may be the second electrodes 210b. In addition, the cross electrodes 220 each may include a third end and a fourth end spaced apart from the third end in the first direction DR1. Cross electrodes respectively connected to the first cross lines 241 at the third end among the cross electrodes 220 may the first cross electrodes 220a, and cross electrodes respectively connected to the second cross lines 242 at the fourth end among the cross electrodes 220 may be the second cross electrodes 220b.

The first lines 231 may extend along a first rotation direction RD1 from the first electrodes 210a towards the pads 200PD. The second lines 232 may extend along a second rotation direction RD2 from the second electrodes 210b towards the pads 200PD. The first cross lines 241 may extend along the first rotation direction RD1 from the first cross electrodes 220a towards the pads 200PD. The second cross lines 242 may extend along the second rotation direction RD2 from the second cross electrodes 220b towards the pads 200PD. The first and second rotation directions RD1 and RD2 may be opposite each other.

The first cross lines 241 may be disposed between the boundary 200BD and the first lines 231, and the second lines 232 may be disposed between the boundary 200BD and the second cross lines 242. The lengths of the first lines 231 may be greater than the lengths of the first cross lines 241, and the lengths of the second cross lines 242 may be greater than the lengths of the second lines 232. For example, the first lines 231 may be connected to the first electrodes 210a far from the pads 200PD and the first cross lines 241 may be connected to the first cross electrodes 220a close to the pads 200PD.

A first boundary 220BD may be between the first cross electrodes 220a and the second cross electrodes 220b, and a second boundary 210BD may be between the first electrodes 210a and the second electrodes 210b. The first boundary 220BD may extend along the first direction DR1, and the second boundary 210BD may extend along the second direction DR2. The first boundary 220BD may be spaced apart from the first reference line 200RL1 along the second direction DR2, and the second boundary 210BD may be spaced apart from the second reference line 200RL2 along the first direction DR1. The distance between the second boundary 210BD and the plurality of pads 200PD may be greater than the distance between the second reference line 200RL2 and the plurality of pads 200PD. The distance between the second boundary 210BD and the second reference line 200RL2 may correspond to a width in the first direction DR1 of the second electrodes 210b.

The first electrodes 210a may be spaced apart from the pads 200PD with the second electrodes 210b therebetween. A first connection area 220CA1 and a second connection area 220CA2 may be provided in the sensor layer 200. The first connection area 220CA1 may be an area in which the first cross electrodes 220a are in contact with a portion of the first cross lines 241, and the second connection area 220CA2 may be an area in which the second cross electrodes 220b are in contact with a portion of the second cross lines 242. The first connection area 220CA1 may be positioned closer to the pads 200PD than the second connection area 220CA2.

According to an embodiment of the inventive concept, the first lines 231 and the second lines 232 may be different in number from each other. In addition, the first cross lines 241 and the second cross lines 242 may be different in number from each other. Accordingly, the first electrodes 210a connected to the first lines 231 and the second electrodes 210b connected to the second lines 232 may be different in number from each other, and the first cross electrodes 220a connected to the first cross lines 241 and the second cross electrodes 220b connected to the second cross lines 242 may be different in number from each other.

Each of the first lines 231 may have a longer length than each of the second lines 232, and each of the first cross lines 241 may have a shorter length than each of the second cross lines 242. The first lines 231 may be fewer in number than the second lines 232. For example, in FIG. 5, three first lines 231 and four second lines 232 are shown; however, the inventive concept is not limited thereto. In addition, the first cross lines 241 may be greater in number than the second cross lines 242. For example, in FIG. 5, six first cross lines 241 and two second cross lines 242 are shown; however, the inventive concept is not limited thereto. Accordingly, the first connection area 220CA1 may be greater in size than the second connection area 220CA2.

According to an embodiment of the inventive concept, the second lines 232 and the first cross lines 241 having a relatively shorter length may be greater in number than the first lines 231 and the second cross lines 242 having a relatively longer length. The first electrodes 210a electrically connected to the first lines 231 may have a shorter length than the second electrode 210M having the longest length among the second electrodes 210b. In addition, the second cross electrodes 220b electrically connected to the second cross lines 242, respectively, may have a shorter length than the first cross electrode 220M having the longest length among the first cross electrodes 220a.

In a comparative example in which the first boundary 220BD and the second boundary 210BD pass through the center 200CP, the first electrodes and the second electrodes may be the same in number, and the first cross electrodes and the second cross electrodes may be the same in number. In this case, at least one of the cross electrodes 220M having the maximum length may be electrically connected to a cross line having the maximum length. In this case, the resistance of the cross electrode and the cross line is assumed to be 100. In the embodiment of the inventive concept shown in FIG. 5, for example, when the first cross electrodes 220a and the second cross electrodes 220b are configured to be different in number, a cross electrode having the maximum length connected to the cross line 242M is not a cross electrode 220M having the maximum length. For example, the cross electrode having the maximum length connected to the cross line 242M may have fewer sensing patterns than the cross electrode 220M having the maximum length. In this case, values for the maximum resistance of the cross line having the maximum length and the cross electrode connected thereto may be reduced by about 20% compared to those in comparative example.

With a decrease in values for the maximum resistance, frequency bandwidths enabling the operation of the sensor layer 200 may increase. For example, the frequency bandwidth according to comparative example may be 125 Hz, and the frequency bandwidth according to an embodiment of the inventive concept may be 137 Hz. When frequencies for operating the sensing layer 200 are required to be changed to prevent a decrease in sensing sensitivity due to external noise, the performance of the sensor layer 200 may be secured when frequency bandwidths for the operation is greater.

According to an embodiment of the inventive concept, the line having the maximum length may not be connected to the electrode having the maximum length. Accordingly, values for the maximum resistance of the electrode and the line may be reduced compared to those in comparative example described above, and the resistance deviation in the sensor layer 200 may be reduced. As a result, the sensor layer 200 may have increased sensing sensitivity.

According to an embodiment of the inventive concept, the electrode 210M having the maximum length among the electrodes 210 is electrically connected to one of the second lines 232 having a relatively shorter length than the first lines 231. In addition, the cross electrode 220M having the maximum length among the cross electrodes 220 may be electrically connected to one of the first cross lines 241 having a relatively shorter length than the second cross lines 242.

According to an embodiment of the inventive concept, a difference in length between the first line 231M having the maximum length among the first lines 231 and the second line 232M having the maximum length among the second lines 232 is greater than a difference in length between the first cross line 241M having the maximum length among the first cross lines 241 and the second cross line 242M having the maximum length among the second cross lines 242. Accordingly, the first boundary 220BD with respect to the center 200CP may have a greater shift than the second boundary 210BD with respect to the center 200CP. In other words, the first boundary 220BD may be farther from the center 200CP along the second direction DR2 than the second boundary 210BD is from the center 200CP along the first direction DR1.

A difference in number between the first lines 231 and the second lines 232 may be smaller than a difference in number between the first crossing lines 241 and the second crossing lines 242. Therefore, a difference in number between the first electrodes 210a and the second electrodes 210b may be smaller than a difference in number between the first cross electrodes 220a and the second cross electrodes 220b. The first cross electrodes 220a may be three times or greater in number than the second cross electrodes 220b. For example, when the number of second cross electrodes 220b is 11, the number of first cross electrodes 220a may be 33.

The first electrodes 210a and the second electrodes 210b each may include a first portion 211 and a second portion 212. The first cross electrodes 220a and the second cross electrodes 220b each may include a sensing pattern 221 and a bridge pattern 222. A first portion 211 may be a portion of the first electrodes 210a facing the sensing pattern 221, and the second portion 212 may be a portion of the first electrodes 210a insulatively crossing the bridge pattern 222. When viewed on a plane, the second portion 212 may cross the bridge pattern 222.

The pads 200PD may be spaced apart from each other along the second direction DR2. The pads 200PD may be spaced apart from the first reference line 200RL1 in the second direction DR2. For example, an area in which the pads 200PD are disposed may be spaced apart from the first reference line 200RL1 in the same direction as the first boundary 220BD. In this case, the length of the cross line to reduce resistance may be shorter. For example, when the pads 200PD are shifted to be adjacent to the first boundary 220BD, the lengths of the second cross lines 242 may be shorter.

In FIG. 5, all of the pads 200PD are arranged in the right section of the first reference line 200RL1 as an example, but the embodiment of the inventive concept is not limited thereto. For example, all of the pads 200PD may be disposed in the left section of the first reference line 200RL1, or some of the pads 200PD may be disposed in the left section of the first reference line 200RL1, and another portion of the pads 200PD may be disposed in the right section of the first reference line 200RL1. In this case, some of the pads 200PD disposed on a first side of the first reference lines 200RL1 and the other pads 200PD disposed on a second side of the first reference lines 200RL1 may be different in number from each other.

Figure 6:
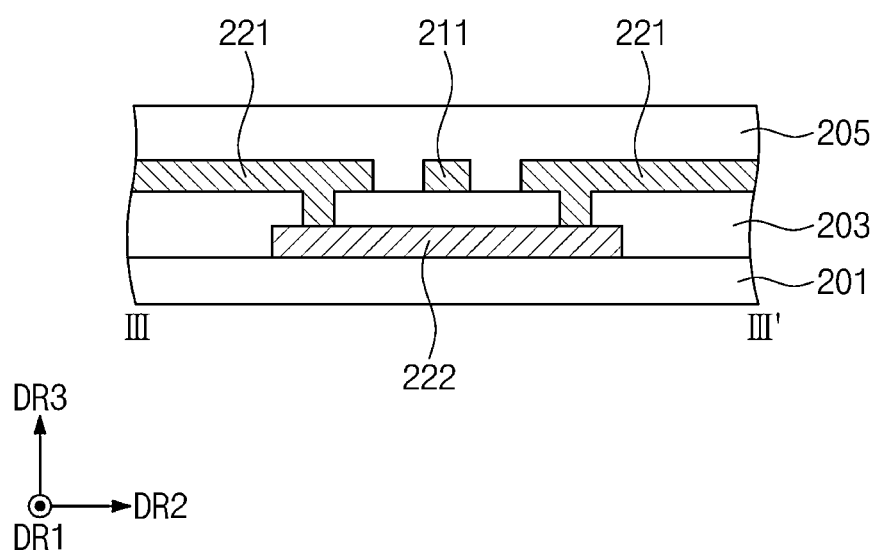
FIG. 6 is a cross-sectional view taken along line III-III' shown in FIG. 5.

An embodiment of the inventive concept provides an electronic device 1000 including: a display layer 100 configured to display images; and a sensor layer 200 disposed on the display layer 100. The sensor layer 200 may include: a plurality of first electrodes 210a disposed in a sensing area 200A of the sensor layer 200, arranged along a first direction DR1, and having different lengths; a plurality of second electrodes 210b disposed in the sensing area 200A and arranged along the first direction DR1; a plurality of first cross electrodes 220a disposed in the sensing area 200A and arranged along a second direction DR2 crossing the first direction DR1; a plurality of second cross electrodes 220b disposed in the sensing area 200A, arranged along the second direction DR2, and having different lengths; and a plurality of pads 200PD disposed in a peripheral area 200N of the sensor layer 200. The sensor layer 200 may further include: a plurality of first lines 231 extended from the plurality of first electrodes 210a at a first side of the sensing area 200A towards the plurality of pads 200PD; a plurality of second lines 232 extended from the plurality of second electrodes 210*b* at a second side of the sensing area 200A, which is different from the first side, towards the plurality of pads 200PD; a plurality of first cross lines 241 extending from the plurality of first cross electrodes 220*a* towards the plurality of pads 200PA; and a plurality of second cross lines 242 extending from the plurality of second cross electrodes 220*b* towards the plurality of pads 200PD. The plurality of first lines 231 may be different from the plurality of second lines 232 in number, and the plurality of first cross lines 241 may be different from the plurality of second cross lines 242 in number. FIG. 6 is a cross-sectional view taken along line III-III' shown in FIG. 5.

Referring to FIG. 6, the bridge pattern 222 may be disposed between the base layer 201 and the sensing insulating layer 203. In other words, the bridge pattern 222 may be included in the first conductive layer 202 (see FIG. 3B).

The sensing pattern 221, the first portion 211, and the second portion 212 (see FIG. 5) may be disposed between the sensing insulating layer 203 and the cover insulating layer 205. In other words, the sensing pattern 221, the first portion 211, and the second portion 212 (see FIG. 5) may be included in the second conductive layer 204 (see FIG. 3B).

The sensing pattern 221 may pass through the sensing insulating layer 203 and electrically contact the bridge pattern 222. The first portion 211 may be spaced apart from the bridge pattern 222 with the sensing insulating layer 203 therebetween, and the first portion 211 may insulatively cross the bridge pattern 222.

Figure 7A:
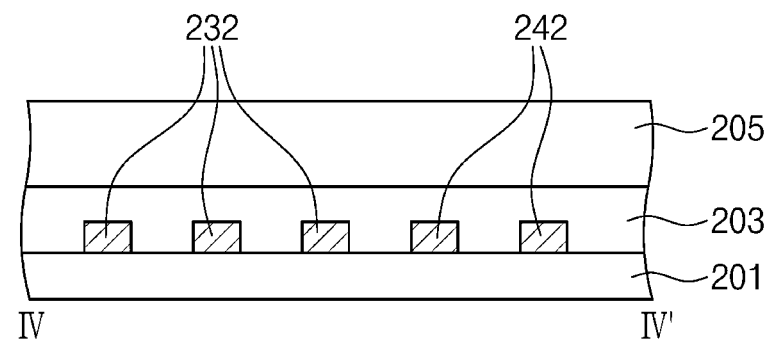
FIG. 7A is a cross-sectional view taken along line IV-IV' shown in FIG. 5 according to an embodiment of the inventive concept.
Figure 7A:
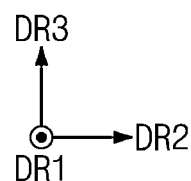

FIG. 7A is a cross-sectional view taken along line IV-IV' shown in FIG. 5 according to an embodiment of the inventive concept.

Referring to FIGS. 5 and 7A, second lines 232 and second cross lines 242 are illustrated. The second lines 232 and the second cross lines 242 may be disposed between the base layer 201 and the sensing insulating layer 203. In other words, the second lines 232 and the second cross lines 242 may be included in the first conductive layer 202 (see FIG. 3B).

Figure 7B:
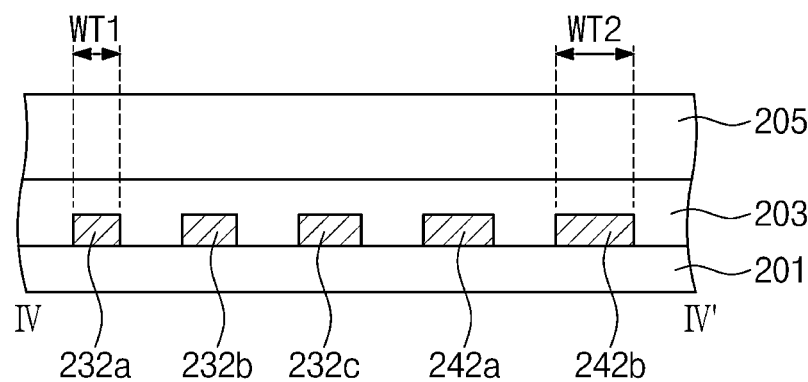
FIG. 7B is a cross-sectional view taken along line IV-IV' shown in FIG. 5 according to an embodiment of the inventive concept.
Figure 7B:
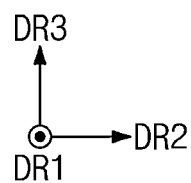

FIG. 7B is a cross-sectional view taken along line IV-IV' shown in FIG. 5 according to an embodiment of the inventive concept.

Referring to FIGS. 5 and 7B, second lines 232*a*, 232*b*, and 232*c*, and second cross lines 242*a* and 242*b* are illustrated. The widths of the second lines 232 and the second cross lines 242 of FIG. 7A may be substantially the same, but the widths of the second lines 232*a*, 232*b*, 232*c* and the second cross lines 242*a* and 242*b* of FIG. 7B may be different from each other.

For example, a width WT2 of the second cross line 242*b* having the longest length may be greater than a width WT1 of the second line 232*a*. Accordingly, the resistance of the second cross line 242*b* may be reduced compared to a case where the width WT2 of the second cross line 242*b* is the same as the width WT1 of the second line 232*a*.

Figure 7C:
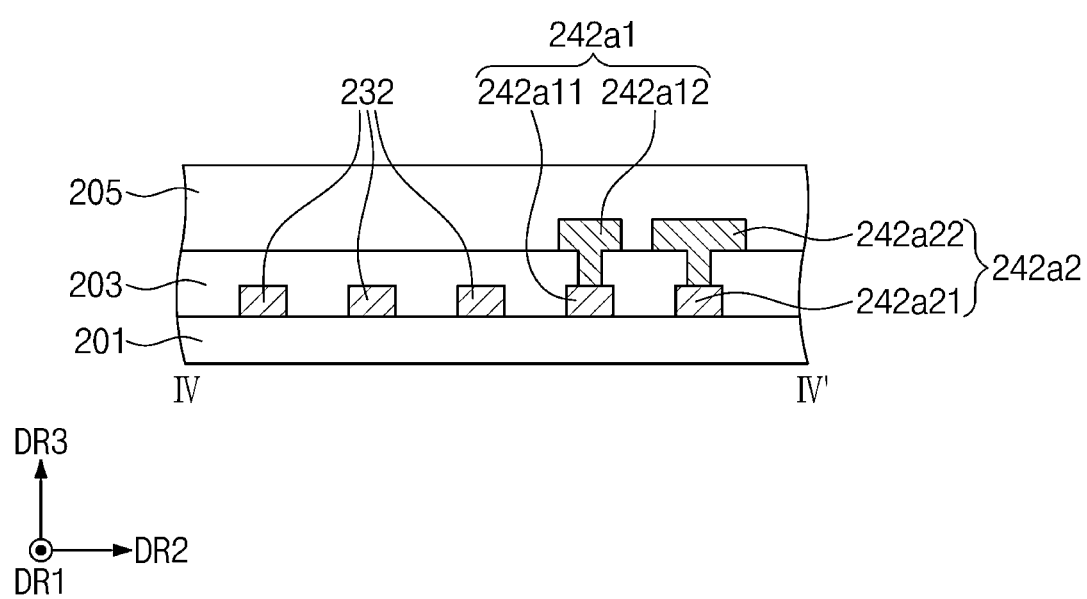
FIG. 7C is a cross-sectional view taken along line IV-IV' shown in FIG. 5 according to an embodiment of the inventive concept.

FIG. 7C is a cross-sectional view taken along line IV-IV' shown in FIG. 5 according to an embodiment of the inventive concept.

Referring to FIGS. 5 and 7C, second lines 232 and second cross lines 242*a*1 and 242*a*2 are illustrated. The second lines 232 may be the same as the second lines 232 described above in FIG. 7A. The second cross line 242*a*1 may include a first line pattern 242*a*11 and a second line pattern 242*a*12, and the second cross line 242*a*2 may include a first line pattern 242*a*21 and a second line pattern 242*a*22. Second cross lines 242*a*1 and 242*a*2 having a relatively longer length are formed using two conductive layers, for example, the first conductive layer 202 (see FIG. 3B) and the second conductive layer 204 (see FIG. 3B), and resistance may thus be reduced.

The first line pattern 242*a*11 and the second line pattern 242*a*12 may be electrically connected to each other through the sensing insulating layer 203, and the first line pattern 242*a*21 and the second line pattern 242*a*22 may be electrically connected to each other through the sensing insulating layer 203. In addition, the width of the second line pattern 242*a*22 may be greater than the width of the second line pattern 242*a*12; however, the width of the second line pattern 242*a*22 and the second line patter 242*a*12 may be the same.

In FIGS. 7A, 7B, and 7C, the second lines and the second cross lines are illustrated as examples, but the above descriptions may be applied to the first lines and the first cross lines.

Figure 8:
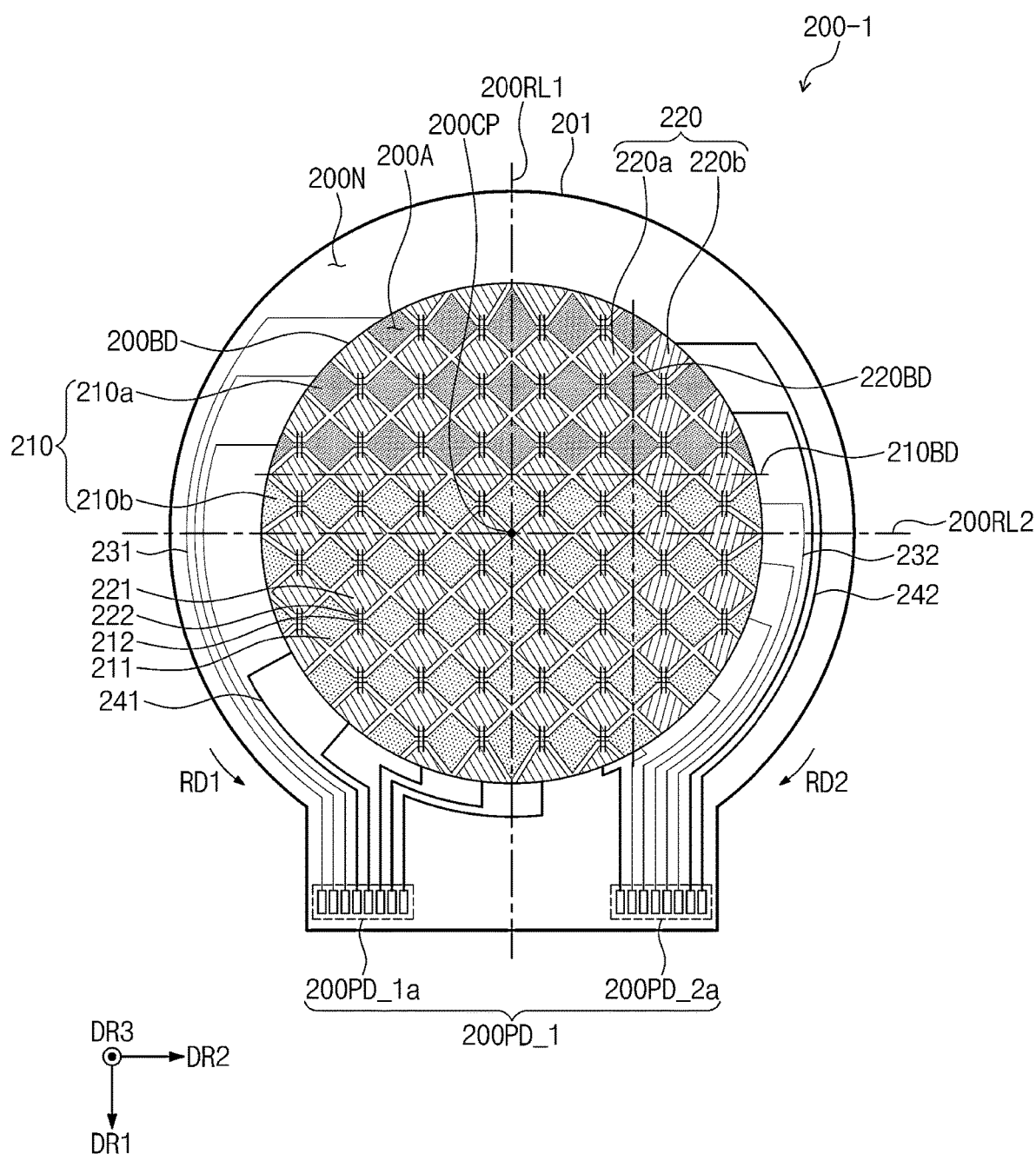
FIG. 8 is a plan view of a sensor layer according to an embodiment of the inventive concept.

FIG. 8 is a plan view of a sensor layer according to an embodiment of the inventive concept. In the description of FIG. 8, the same reference numerals are given for the same content as those described in FIG. 5, and descriptions thereof will be omitted.

Referring to FIG. 8, a sensor layer 200-1 may include pads 200PD_1. The positions of the pads 200PD_1 are different from the positions of the pads 200PD of the sensor layer 200 illustrated in FIG. 5. For example, the pads 200PD_1 may include first pads 200PD_1*a* and second pads 200PD_2*a*. The first pads 200PD_1*a* and the second pads 200PD_2*a* may be spaced apart from each other with the first reference line 200RL1 therebetween. Display pads may be disposed between the first pads 200PD_1*a* and the second pads 200PD_2*a*.

The second pads 200PD_2*a* are spaced apart from the first reference line 200RL1 in the second direction DR2, and the second cross lines 242 may thus have a shorter length compared to a case where the second pads 200PD_2*a* are disposed closer to the first reference line 200RL1. In addition, the first pads 200PD_1*a* are spaced apart from the first reference line 200RL1 in a direction opposite to the second direction DR2, and the first lines 231 may thus have a shorter length compared to a case where the first pads 200PD_1*a* are disposed closer to the first reference line 200RL1.

Figure 9:
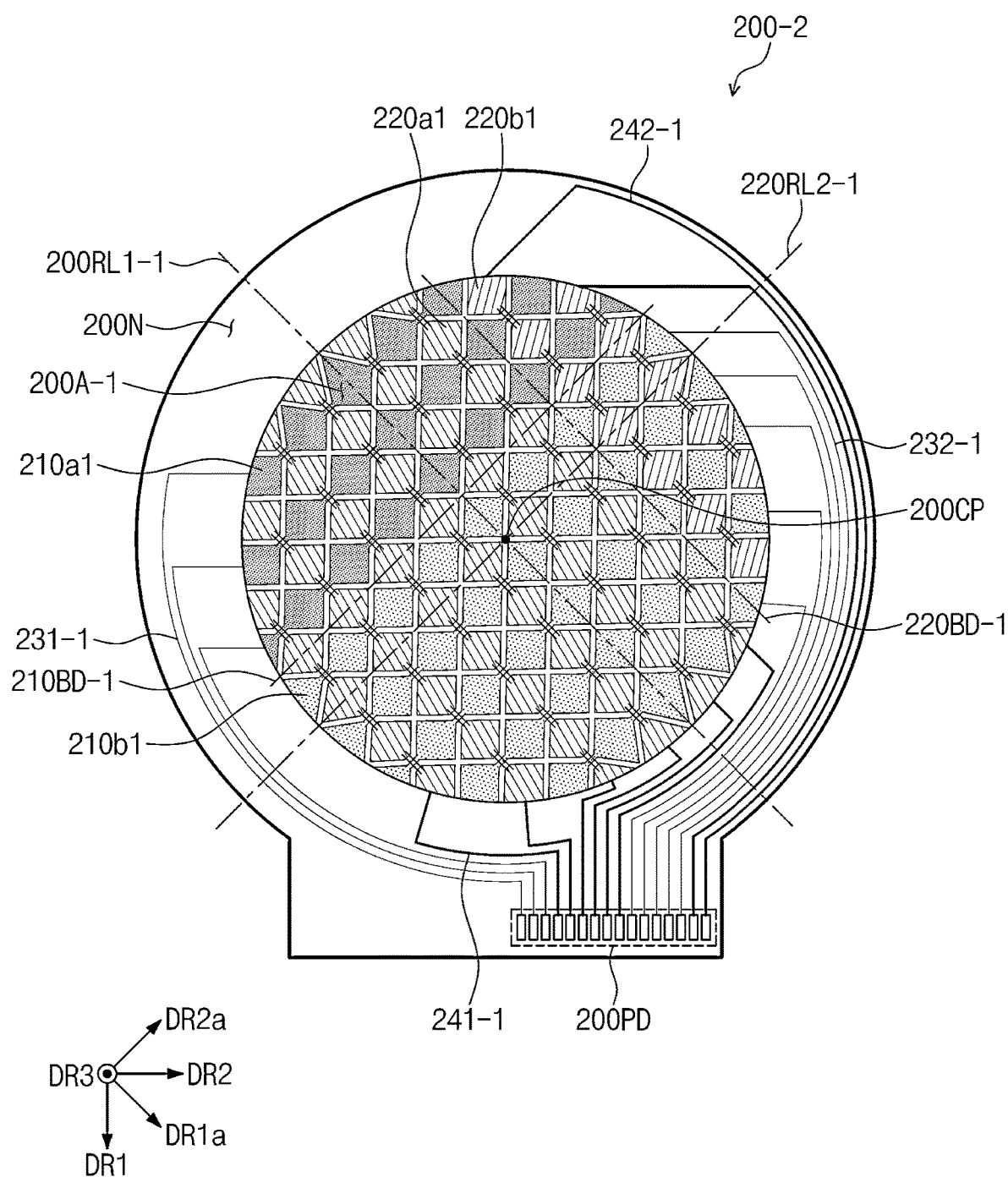
FIG. 9 is a plan view of a sensor layer according to an embodiment of the inventive concept.

FIG. 9 is a plan view of a sensor layer according to an embodiment of the inventive concept.

Referring to FIG. 9, a sensing area 200A-1 of the sensor layer 200-2 may have a shape rotated by about 45 degrees in a counterclockwise direction as compared to the sensing area 200A of the sensor layer 200-2 shown in FIG. 5. The rotated angle and the rotation direction are merely presented as an example, and are not limited thereto.

For example, in the sensing area 200A-1 of the sensor layer 200-2, first electrodes 210*a*1, second electrodes 210*b*1, first cross electrodes 220*a*1, and second cross electrodes 220*b*1 may be disposed. The first electrodes 210*a*1 and the second electrodes 210*b*1 may be arranged along a first cross direction DR1*a*, and the first electrodes 210*a*1 and the second electrodes 210*b*1 each may extend in a second cross direction DR2*a*. The first cross electrodes 220*a*1 and the second cross electrodes 220*b*1 may be arranged along the second cross direction DR2*a*, and the first cross electrodes 220*a*1 and the second cross electrodes 220*b*1 each may extend along the first cross direction DR1*a*. The sensor layer 200-2 may further include first lines 231-1, second lines 232-1, first cross lines 241-1, and second cross lines 242-1.

The first cross direction DR1*a* may be a direction between the first direction DR1 and the second direction DR2, and the second cross direction DR2*a* may be a direction crossing the first cross direction DR1a, and be a direction perpendicular to the first cross direction DR1a.

A first reference line 200RL1-1 may extend along the first cross direction DR1a and pass through the center 200CP. A second reference line 200RL2-1 may extend along the second cross direction DR2a and pass through the center 200CP.

A first boundary 220BD-1 may be located between the first cross electrodes 220a1 and the second cross electrodes 220b1, and a second boundary 210BD-1 may be located between the first electrodes 210a1 and the second electrodes 210b1. The first boundary 220BD-1 may extend along the first cross direction DR1a, and the second boundary 210BD-1 may extend along the second cross direction DR2a. The first boundary 220BD-1 may be spaced apart from the first reference line 200RL1-1, and the second boundary 210BD-1 may be spaced apart from the second reference line 200RL2-1. Although the distance between the first boundary 220BD-1 and the first reference line 200RL1-1 is greater than a distance between the second boundary 210BD-1 and the second reference line 200RL2-1, the inventive concept is not limited thereto and the distance between the first boundary 220BD-1 and the first reference line 200RL1-1 may be less than or the same as the distance between the second boundary 210BD-1 and the second reference line 200RL2-1.

According to an embodiment of the inventive concept, to reduce the resistance deviation in the sensor layer 200-2, the sensor layer 200-2 may be configured such that the line having the maximum length is not connected to the electrode having the maximum length, and the cross line having the maximum length is not connected to the cross line electrode having the maximum length. Accordingly, the sensing sensitivity of the sensor layer 200-2 having reduced maximum resistance values may be increased.

Figure 10:
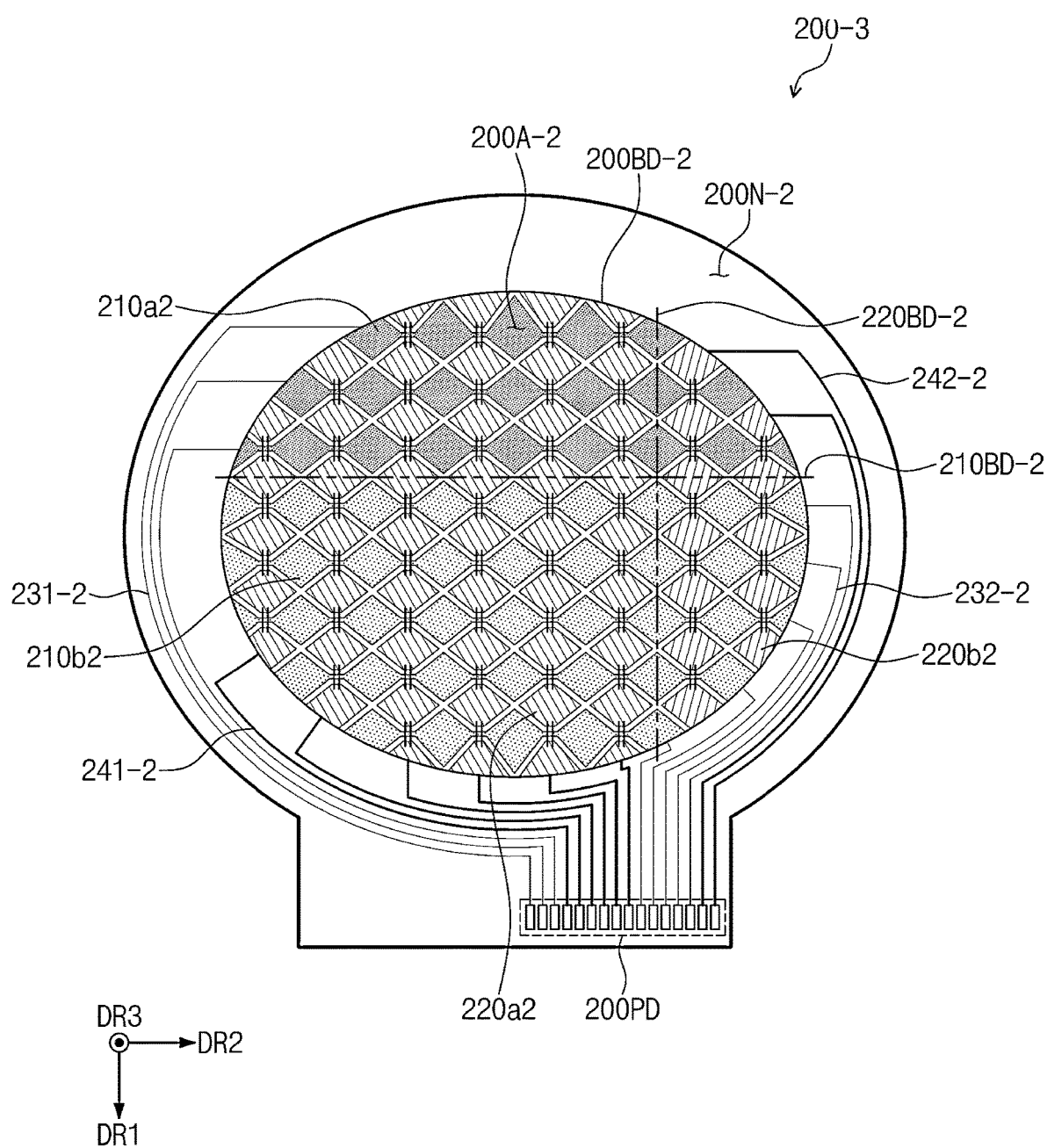
FIG. 10 is a plan view of a sensor layer according to an embodiment of the inventive concept.

FIG. 10 is a plan view of a sensor layer according to an embodiment of the inventive concept.

Referring to FIG. 10, a sensing area 200A-2 and a peripheral area 200N-2 may be provided in the sensor layer 200-3. A boundary 200BD-2 between the sensing area 200A-2 and the peripheral area 200N-2 may have an oval shape.

The sensor layer 200-3 may include first electrodes 210a2, second electrodes 210b2, first cross electrodes 220a2, and second cross electrodes 220b2 disposed in the sensing area 200A-2. The first electrodes 210a2 may be fewer in number than the second electrodes 210b2, and the first cross electrodes 220a2 may be greater in number than the second cross electrodes 220b2.

The sensor layer 200-3 may further include first lines 231-2, second lines 232-2, first cross lines 241-2, second cross lines 242-2 and first and second boundaries 210BD-2 and 220BD-2.

According to an embodiment of the inventive concept, to reduce the resistance deviation in the sensor layer 200-3, the sensor layer 200-3 may be configured such that the line having the maximum length is not connected to the electrode having the maximum length, and the cross line having the maximum length is not connected to the cross line electrode having the maximum length. Accordingly, the sensing sensitivity of the sensor layer 200-3 having reduced maximum resistance values may be increased.

Figure 11:
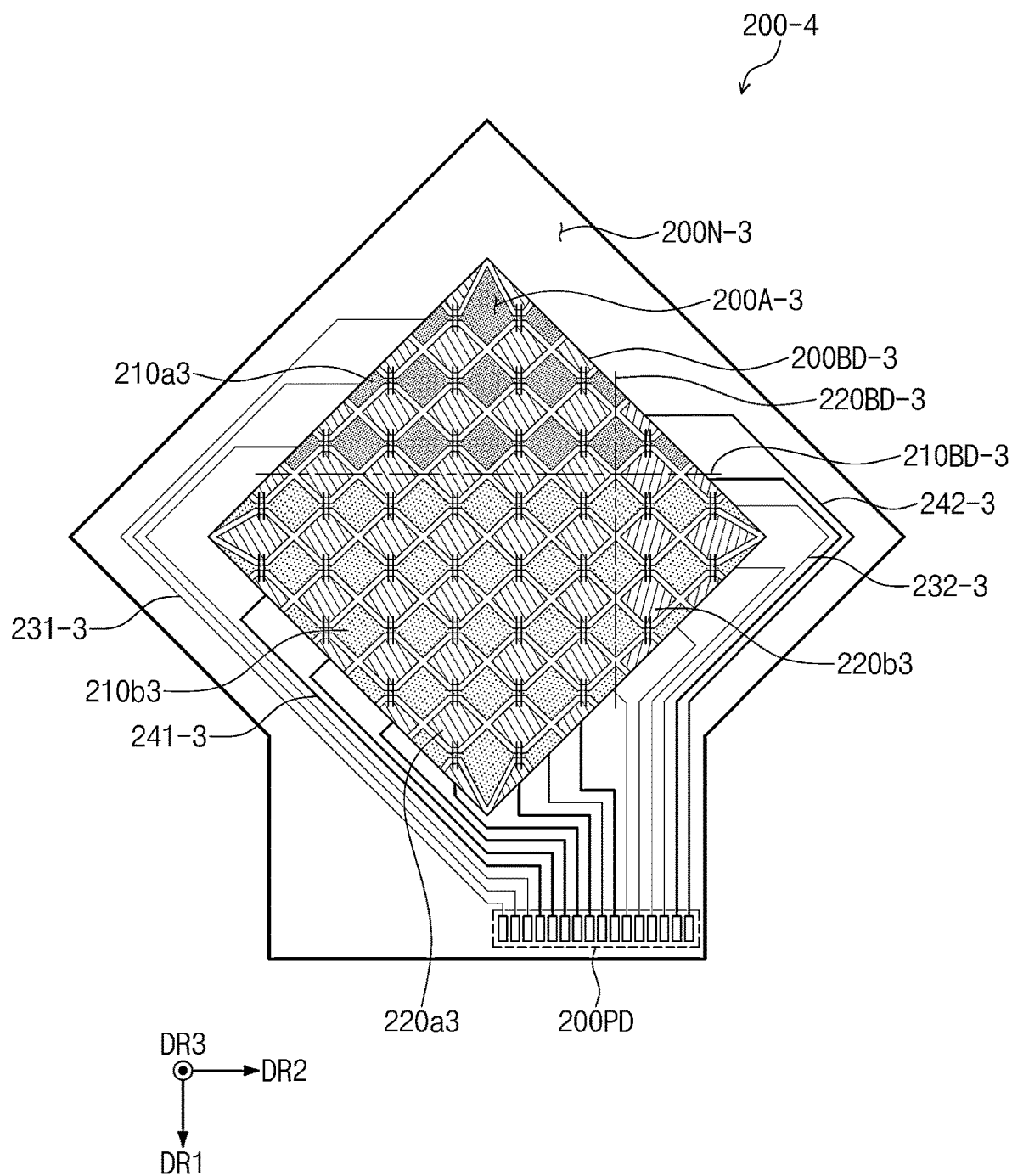
FIG. 11 is a plan view of a sensor layer according to an embodiment of the inventive concept.

FIG. 11 is a plan view of a sensor layer according to an embodiment of the inventive concept.

Referring to FIG. 11, a sensing area 200A-3 and a peripheral area 200N-3 may be defined in a sensor layer 200-4. A boundary 200BD-3 between the sensing area 200A-3 and the peripheral area 200N-3 may have a rhombus shape.

The sensor layer 200-4 may include first electrodes 210a3, second electrodes 210b3, first cross electrodes 220a3, and second cross electrodes 220b3 disposed in the sensing area 200A-3. The first electrodes 210a3 and the second electrodes 210b3 may be different in number from each other, and the first cross electrodes 220a3 and the second cross electrodes 220b3 may be different in number from each other. For example, the first electrodes 210a3 may be fewer in number than the second electrodes 210b3, and the first cross electrodes 220a3 may be greater in number than the second cross electrodes 220b3.

The sensor layer 200-4 may further include first lines 231-3, second lines 232-3, first cross lines 241-3, second cross lines 242-3 and first and second boundaries 210BD-3 and 220BD-3.

According to an embodiment of the present disclosure, to reduce the resistance deviation in the sensor layer 200-4, the sensor layer 200-4 may be configured such that the line having the maximum length is not connected to the electrode having the maximum length, and the cross line having the maximum length is not connected to the cross line electrode having the maximum length. Accordingly, the sensing sensitivity of the sensor layer 200-4 having reduced maximum resistance values may be increased.

Figure 12:
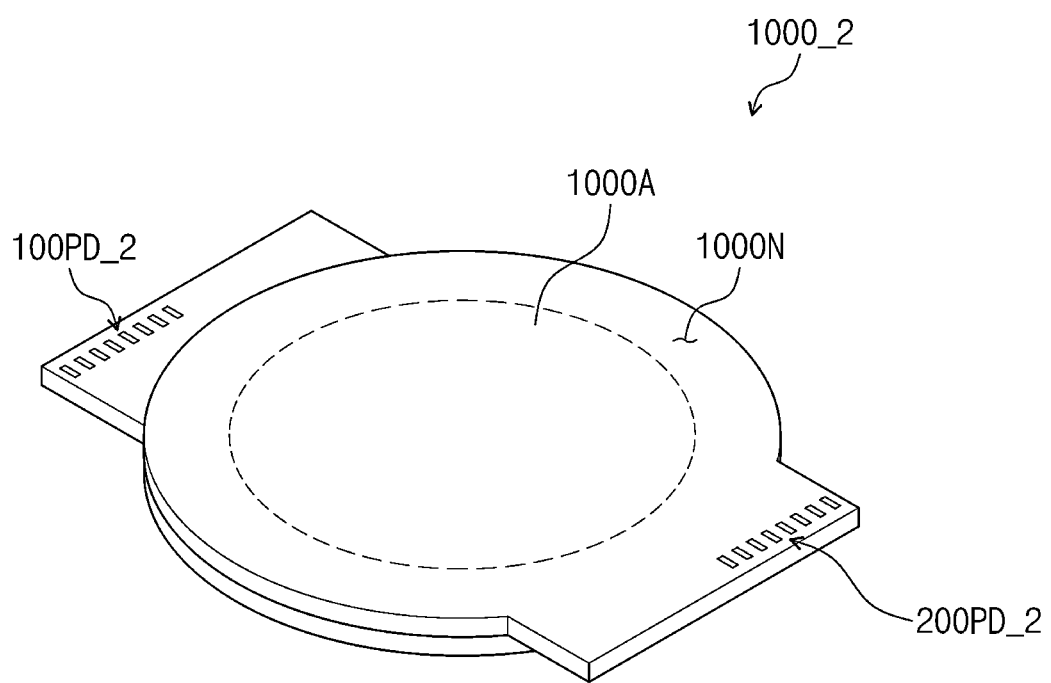
FIG. 12 is a perspective view of an electronic device according to an embodiment of the inventive concept.

FIG. 12 is a perspective view of an electronic device according to an embodiment of the inventive concept.

Referring to FIG. 12, the display pads 100PD_2 and the pads 200PD_2 of the electronic device 1000_2 may be spaced apart from each other with the active area 1000A therebetween. In other words, an area in which the display pads 100PD_2 are disposed and an area in which the pads 200PD_2 are disposed may be separated. In this case, the degree of freedom in configuring the positions of the pads 200PD_2 may be increased compared to a case where the pads 200PD_2 are disposed in an area adjacent to the display pads 100PD_2. Therefore, the positions of the pads 200PD_2 may be easily controlled to reduce values for maximum resistance in the sensor layer.

As described above, an electronic device may include electrodes, cross electrodes, first and second lines electrically connected to the electrodes, respectively, and first and second cross lines electrically connected to the cross electrodes, respectively. Each of the second lines may have a shorter length than each of the first lines, and the second lines may be greater in number than the first lines. In addition, each of the second cross lines may have a longer length than each of the first cross lines, and the second cross lines may be fewer in number than the first cross lines. Accordingly, the electrodes connected to the first lines may have a shorter maximum length than the electrodes connected to the second lines, and the cross electrodes connected to the second cross lines may have a shorter maximum length than the cross electrodes connected to the first cross lines. In other words, an electrode or cross electrode having the maximum length may not be connected to a line or cross line having the maximum length. Therefore, values for maximum resistance in the sensor layer may be reduced, and resistance deviation in the sensor layer may be reduced. As a result, the sensor layer may have increased sensing sensitivity.

Although the inventive concept has been described with reference to embodiments of the inventive concept, it will be understood that the inventive concept should not be limited to these embodiments but various changes and modifications can be made by those skilled in the art without departing from the spirit and scope of the inventive concept.

What is claimed is:

1. An electronic device, comprising:
   a display layer configured to display images; and
   a sensor layer disposed on the display layer,
   wherein the sensor layer includes first electrodes disposed in a sensing area, second electrodes disposed in the sensing area and crossing the first electrodes, first lines disposed in a peripheral area and electrically connected to the first electrodes, and second lines disposed in the peripheral area and electrically connected to the second electrodes,
   wherein the first electrodes comprise a first-first electrode and a first-second electrode spaced apart from the first-second electrode in a first direction,
   wherein a first distance between a first end of the first-first electrode and a second end of the first-first electrode that is spaced farthest from the first end in a second direction crossing the first direction is less than a second distance between a third end of the first-second electrode and a fourth end of the first-second electrode that is spaced farthest from the third end in the second direction,
   wherein the first lines comprise a first-first line electrically connected to the first end of the first-first electrode and a first-second line electrically connected to the third end of the first-second electrode, and
   a length of the first-first line is longer than a length of the first-second line.

2. The electronic device of claim 1, wherein the sensor layer further comprises pads arranged in the peripheral area, and
   the pads are arranged along the second direction.

3. The electronic device of claim 2, wherein a first reference line is defined that extends along the first direction and crosses a center of the sensing area, and an area where the pads are arranged does not overlap with the first reference line.

4. The electronic device of claim 3, wherein each of one end of the first-first electrode connected to the first-first line and one end of the first-second electrode connected to the first-second line is spaced apart from the pads with the first reference line interposed therebetween.

5. The electronic device of claim 2, wherein each of the first electrodes includes a first end and a second end spaced apart from the first end in the second direction, and
   the first electrodes include first group electrodes connected to first group lines among the first lines at first ends and second group electrodes connected to second group lines among the first lines at second ends.

6. The electronic device of claim 5, wherein the first group electrodes are spaced further apart from the pads than the second group electrodes.

7. The electronic device of claim 6, wherein the number of the first group electrodes is less than the number of the second group electrodes.

8. The electronic device of claim 6, wherein the first group electrodes include the first-first electrode and the first-second electrode.

9. The electronic device of claim 5, wherein the first group lines and the second group lines are spaced apart with the sensing area interposed therebetween.

10. The electronic device of claim 5, wherein each of the second electrodes includes a third end and a fourth end spaced apart from the third end in the first direction, and
    wherein the second electrodes include third group electrodes connected to third group lines among the second lines at third ends and fourth group electrodes connected to fourth group lines among the second lines at fourth ends.

11. The electronic device of claim 10, wherein the number of the third group electrodes is greater than the number of the fourth group electrodes.

12. The electronic device of claim 11, wherein a first reference line is defined that extends along the first direction and crosses a center of the sensing area, and the fourth group electrodes and the pads are arranged on same side of the first reference line.

13. The electronic device of claim 10, wherein a difference between the number of the first group electrodes and the number of the second group electrodes is smaller than a difference between the number of the third group electrodes and the number of the fourth group electrodes.

14. An electronic device, comprising:
    a base layer;
    a circuit layer disposed on the base layer;
    a light-emitting element layer disposed on the circuit layer and including a light-emitting element; and
    a sensor layer disposed on the light-emitting element layer and having a sensing area and a peripheral area,
    wherein the sensor layer comprises:
    a first electrode disposed in the sensing area and comprising a first end and a second end spaced farthest from the first end;
    a second electrode disposed in the sensing area, spaced apart from the first electrode in a first direction, and comprising a third end and a fourth end spaced farthest from the third end;
    a third electrode disposed in the sensing area and crossing the first electrode and the second electrode;
    a first line disposed in the peripheral area and electrically connected to the first end of the first electrode;
    a second line disposed in the peripheral area and electrically connected to the third end of the second electrode, and having a shorter length than that of the first line; and
    a third line disposed in the peripheral area and electrically connected to the third electrode,
    wherein the first end and the second end are spaced in a second direction crossing the first direction, and the third end and the fourth end are spaced in the second direction, and
    wherein a first distance between the first end of the first electrode and the second end of the first electrode is less than a second distance between the third end of the second electrode and the fourth end of the second electrode.

15. The electronic device of claim 14, wherein the sensor layer further includes pads arranged in the peripheral area,
    a first reference line is defined that extends along the first direction and crosses a center of the sensing area, and
    an area where the pads are arranged does not overlap with the first reference line.

16. The electronic device of claim 15, wherein the first line and the second line are electrically connected to the pads, and the first line and the second line extend from the pads, pass through the first reference line, and are electrically connected to the first electrode and the second electrode, respectively.

17. An electronic device, comprising:
first group electrodes arranged sequentially along a first direction;
second group electrodes arranged sequentially along the first direction;
third group electrodes arranged sequentially along a second direction intersecting the first direction;
fourth group electrodes arranged sequentially along the second direction;
first group lines electrically connected to the first group electrodes; and
second group lines electrically connected to the second group electrodes and spaced apart from the first group lines with the second group electrodes interposed therebetween,
wherein lengths of the first group electrodes are different from each other, and the number of the first group electrodes is less than the number of the second group electrodes.

18. The electronic device of claim 17, further comprising:
third group lines electrically connected to the third group electrodes; and
fourth group lines electrically connected to the fourth group electrodes and spaced apart from the third group lines with the third group electrodes interposed therebetween,
wherein the number of the third group electrodes is greater than the number of the fourth group electrodes.

19. The electronic device of claim 18, wherein a difference between the number of the first group electrodes and the number of the second group electrodes is smaller than a difference between the number of the third group electrodes and the number of the fourth group electrodes.

20. The electronic device of claim 17, further comprising:
pads arranged closer to the second group electrodes than to the first group electrodes and electrically connected to the first group lines and the second group lines.

* * * * *